United States Patent
Wang et al.

(10) Patent No.: US 10,904,039 B2
(45) Date of Patent: Jan. 26, 2021

(54) METHODS AND APPARATUSES FOR DATA TRANSMISSION IN A WIRELESS COMMUNICATION SYSTEM

(71) Applicant: NEC(CHINA) CO., LTD., Beijing (CN)

(72) Inventors: Gang Wang, Beijing (CN); Zhennian Sun, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 282 days.

(21) Appl. No.: 14/780,053

(22) PCT Filed: Mar. 29, 2013

(86) PCT No.: PCT/CN2013/073472
§ 371 (c)(1),
(2) Date: Sep. 25, 2015

(87) PCT Pub. No.: WO2014/153777
PCT Pub. Date: Oct. 2, 2014

(65) Prior Publication Data
US 2016/0056977 A1 Feb. 25, 2016

(51) Int. Cl.
*H04L 25/02* (2006.01)
*H04L 5/00* (2006.01)
(Continued)

(52) U.S. Cl.
CPC ........ *H04L 25/0202* (2013.01); *H04L 5/0048* (2013.01); *H04W 72/0446* (2013.01); *H04W 72/1289* (2013.01); *H04L 25/0224* (2013.01)

(58) Field of Classification Search
CPC ............. H04L 25/0202; H04L 5/0048; H04W 72/0446; H04W 72/1289
(Continued)

(56) References Cited

U.S. PATENT DOCUMENTS

2008/0267318 A1* 10/2008 Ihm ...................... H04B 7/0671
  375/299
2011/0274040 A1* 11/2011 Pani ...................... H04W 72/12
(Continued)

FOREIGN PATENT DOCUMENTS

| CN | 101958774 A | 1/2011 |
| CN | 102340463 A | 2/2012 |

(Continued)

OTHER PUBLICATIONS

International Search Report of PCT/CN2013/073472, dated Jan. 2, 2014. [PCT/ISA/210].
(Continued)

*Primary Examiner* — Ronald B Abelson
(74) *Attorney, Agent, or Firm* — Sughrue Mion, PLLC

(57) ABSTRACT

Embodiments of the present disclosure relate to downlink/ uplink data transmission in a wireless communication system. In an embodiment of the present disclosure, there is provided a method for downlink data transmission in a wireless communication system which comprises transmitting an indication for a new-type reference signal to a user equipment, wherein the new-type reference signal has an identical location in frequency domain to a legacy reference signal; and transmitting the new-type reference signal and the legacy reference signal to the user equipment for using in channel estimation. In a case of more than one antenna port, the new-type reference signal may be designed to have a different location in time domain from a legacy reference signal to avoid interference to other antenna ports. With embodiments of the present disclosure, it is possible to perform a channel estimation based on both the legacy reference signal and the new-type reference signal to achieve a higher accuracy of channel estimation, and thus a UE with a low SNR may be also used in LTE networks.

12 Claims, 19 Drawing Sheets

(51) Int. Cl.
*H04W 72/04* (2009.01)
*H04W 72/12* (2009.01)
(58) Field of Classification Search
USPC .......................................................... 370/336
See application file for complete search history.

(56) References Cited

U.S. PATENT DOCUMENTS

| | | | |
|---|---|---|---|
| 2012/0224555 A1 | 9/2012 | Lee et al. | |
| 2012/0281651 A1* | 11/2012 | Jonsson | H04L 69/22 370/329 |
| 2013/0136199 A1 | 5/2013 | Wan et al. | |
| 2013/0182692 A1 | 7/2013 | Dai et al. | |
| 2013/0265955 A1* | 10/2013 | Kim | H04W 72/04 370/329 |
| 2013/0301563 A1* | 11/2013 | Gupta | H04L 5/0048 |
| 2015/0009883 A1* | 1/2015 | Bai | H04L 5/0007 370/312 |

FOREIGN PATENT DOCUMENTS

| | | |
|---|---|---|
| CN | 102413572 A | 4/2012 |
| CN | 102858016 A | 1/2013 |
| JP | 2009-171025 A | 7/2009 |
| JP | 2009-290451 A | 12/2009 |
| JP | 2011-77647 A | 4/2011 |
| JP | 2012-100213 A | 5/2012 |
| JP | 2013-34115 A | 2/2013 |
| JP | 2013510541 A | 3/2013 |
| WO | 2011057257 A1 | 5/2011 |
| WO | 2011/074807 A2 | 6/2011 |
| WO | 2012063368 A1 | 5/2012 |
| WO | WO2014109621 * | 7/2014 ............. H04J 11/00 |

OTHER PUBLICATIONS

Written Opinion of PCT/CN2013/073472, dated Dec. 26, 2013. [PCT/ISA/237].
Communication dated Oct. 25, 2016, issued by the European Patent Office in corresponding European Application No. 13880240.0.
Sony, "Coverage enhancement by downlink power-density boosting for low-cost MTC UEs", Discussion, 3GPP TSG RAN WG1 #72, St Julian's, Malta, Jan. 28-Feb. 1, 2013, R1-130237, 10 pages total.
LG Electronics, "Cell Acquisition and Reference Signals for Coverage Limiting MTC UEs", Discussion and decision, 3GPP TSG RAN WG1#72, St Julian's, Malta, Jan. 28-Feb. 1, 2013, R1-130263, 8 pages total.
LG Electronics, "Text Proposal on Coverage Enhancement for a MTC UE", Discussion and decision, 3GPP TSG WG1 #72, St Julian's, Malta, Jan. 28-Feb. 1, 2013, R1-130264, 8 pages total.
Alcatel-Lucent Shanghai Bell, Alcatel-Lucent, "Analysis of the channel model for MTC", Discussion and decision, 3GPP TSG-RAN WG1 #72, St Julian's, Malta, Jan. 28-Feb. 1, 2013, R1-130463, 5 pages total.
Huawei, HiSilicon, "Solutions on coverage improvement for low cost MTC", Discussion, 3GPP TSG RAN WG1 Meeting #71, New Orleans, USA, Nov. 12-16, 2012, R1-124705, 5 pages total.
China Telecom, "Discussion on coverage improvement for MTC", Discussion, 3GPP TSG RAN WG1 Meeting #71, New Orleans, USA, Nov. 12-16, 2012, R1-124793, 6 pages total.
NEC Group, "PUSCH Coverage Enhancement for Low Cost MTC", Discussion and Decision, 3GPP TSG RAN WG1 Meeting #72bis, Chicago, USA, Apr. 15-19, 2013, R1-131265, 6 pages total.
NEC Group, "PDSCH Coverage Enhancement for Low Cost MTC", Discussion and Decision, 3GPP TSG RAN WG1 Meeting #72bis, Chicago, USA, Apr. 15-19, 2013, R1-131266, 7 pages total.
Communication dated Oct. 25, 2016, issued by the Japan Patent Office in corresponding Japanese Application No. 2016-504439.
Machine Translation of CN 102413572 (original document submitted on Sep. 25, 2015).
Machine Translation of JP 2009-171025 (original document submitted on Sep. 25, 2015).
Machine Translation of JP 2012-100213 (original document submitted on Sep. 25, 2015).
Communication dated Jan. 3, 2018, from State Intellectual Property Office of the P.R.C. in counterpart application No. 201380075265.1.
ZTE, "Text proposal on Coverage improvement Analysis of Physical channels and Signal for TR36.888", 3GPP TSG RAN WG1 Meeting #72, Jan. 28-Feb. 1, 2018, Document for: Discussion and Decision, R1-130200 (5 pages total) <URL:http://www.3gpp.org/ftp/tsg_ran/WG1_RL1/TSGR1_72/Docs/R1-130200.zip>.
Communication dated Jun. 12, 2018, issued by the Japan Patent Office in corresponding Japanese Application No. 2017-156415 (Drafting Date: May 31, 2018).
Huawei, HiSilicon, "Coverage enhancement for physical channels and signals for low-cost MTC", 3GPP TSG RAN WG1 Meeting #72, Jan. 28-Feb. 1, 2013, Discussion and decision, R1-130017 <URL:http://www.3gpp.org/ftp/tsg_ran/WG1_RL1/TSGR1_72/Docs/R1-130017.zip> (9 pages total).
Communication dated Dec. 11, 2018, from the Japanese Patent Office in counterpart application No. 2017-156415.
Communication dated Feb. 14, 2017 from the Japanese Patent Office in counterpart Application No. 2016-504439.
Communication dated Mar. 31, 2020, from the Japanese Patent Office in application no. 2019-114194.
Notification of Reasons for Refusal dated Aug. 25, 2020 from the Japanese Patent Office in Application No. 2019-114194.
Notification of the First Office Action dated Sep. 22, 2020 from the China National Intellectual Property Administration in Application No. 201810475984.7.

* cited by examiner

US 10,904,039 B2

METHODS AND APPARATUSES FOR DATA TRANSMISSION IN A WIRELESS COMMUNICATION SYSTEM

CROSS REFERENCE TO RELATED APPLICATIONS

This application is a National Stage of International Application No. PCT/CN2013/073472 filed Mar. 29, 2013, the contents of which are incorporated herein by reference in its entirety.

FIELD OF THE INVENTION

Embodiments of the present disclosure generally relate to wireless communication techniques and more particularly relate to a method and apparatus for downlink data transmission in a wireless communication system and a method and apparatus for uplink data transmission in a wireless communication system.

BACKGROUND OF THE INVENTION

With the constant increase of mobile data services, the 3rd Generation Partnership Project (3GPP) organization has developed long-term evolution (LTE) specifications and LTE-Advanced (LTE-A) specifications. As the next generation cellular communication standard, an LTE or LTE-Advance system can operate in both Frequency Division Duplex (FDD) mode and Time Division Duplex (TDD) mode.

Machine-to-Machine (M2M) communication, which may also be called as Machine-Type Communications (MTC), is an emerging communication pattern. It refers to communication between computer, embedded processors, smart sensors, actuators and mobiles devices without or with only limited human intervention and it is quite advantageous in many applications such as sensing in extreme or hazard environment. Generally, many of MTC UEs are targeting low-end applications (low average revenue per user, and low data rate) that can be handled adequately by GSM/GPRS and thus they may be implemented at low cost.

As LTE deployments evolve, it is desirable to reduce the cost of overall network maintenance by minimizing the number of Radio Access Technologies (RATs). However, there are deployed more and more MTC UEs in the field, which increases reliance on GSM/GPRS networks, and thus cost for operating these networks are increased. Hence, it will be very beneficial if low-end MTC UEs may be migrated from GSM/GPRS to LTE Networks.

It is known that in LTE releases 8 to 11, data transmission is designed for medium or high SNR (SNR>−5 dB), but SNR of MTC UE could be as low as −25.3 dB. Accordingly, it is rather challenging to support MTC UEs in current Available LTE release.

FIG. 1A illustrates a mapping of downlink reference signals (normal cyclic prefix) as proposed in 3GPP TS 36.211. As illustrated, there are shown mappings of downlink cell specific reference signals (CRS) for one antenna port, two antenna ports and four antenna ports. In this figure, each block represents a resource element (RE), and in order to prevent the interference between these ports, the resource elements which are used in one antenna port are not used for transmission in another antenna port, and vice versa. FIG. 1B schematically illustrates CRS configuration based on Rel. 8, which is specified in 3GPP TS36.211. As illustrated, in step S101, evolved Node B (eNB) sends antennaPortsCount representing the number of cell specific antenna ports to user equipment (UE) by Radio Resource Control (RRC) signalling. Then at step S102, the eNB sends CRS in corresponding antenna ports to the UE. The UE receives the CRS in an antenna port as indicated by antennaPortsCount and estimates channel based on the received CRS as step S103. Afterwards, the UE will carry out detection based on channel estimation results. However, as mentioned hereinabove, the illustrated CRS pattern is designed of medium and high SNR, and thus they can not be applied to MTC because it might bring out very low channel estimation accuracy.

Regarding the MTC UE migration, the 3GPP has started a study item to study a possibility to support MTC UEs in a low SNR region. In R1-130237, there was proposed to use demodulation reference signals (DMRS) configuration in LTE release 10 for MTC and suggest applying power boosting. FIG. 2A illustrates mapping of UE-specific reference signals in antenna ports 7, 8, 9 and 10 (normal cyclic prefix) and FIG. 2B illustrates DMRS configuration based on Rel. 10 (3GPP TS 36.211 & TS 36. 331). As illustrated in FIG. 2A, antenna ports 7 and 8 have an identical mapping and antenna port 9 and 10 also have an identical mapping. This means that for MTC, it may only use one of antenna ports 7 and 8 and one of antenna ports 9 and 10 to avoid interference between ports. In FIG. 2B, antenna ports 7 and 9 are used. The operations as illustrated in FIG. 2B are substantially similar to that in FIG. 1B except that the eNB sends transmission mode-r10 to the UE instead of antennaPortsCount and the eNB send DMRS to the UE instead of CRS. Thus, like the CRS in Rel. 8, the DMRS configuration is still not suitable for MTC with a low SNR.

Therefore, there is a need for a new solution of data transmission in a wireless for improving accuracy of channel estimation in a low SNR communication such as MTC.

SUMMARY OF THE INVENTION

In view of the foregoing, the present disclosure provides a new solution for data transmission in a wireless communication system so as to solve or at least partially mitigate at least a part of problems in the prior art.

According to a first aspect of the present disclosure, there is provided a method for downlink data transmission in a wireless communication system. The method may comprise transmitting an indication for a new-type reference signal to a user equipment, wherein the new-type reference signal may be designed to have an identical location in frequency domain to a legacy reference signal; and transmitting the new-type reference signal and the legacy reference signal to the user equipment for using in channel estimation.

In an embodiment of the present disclosure, the new-type reference signal may be designed to have a different location in time domain from the legacy reference signal.

In another further embodiment of the present disclosure, the method may further comprise determining a transmission repetition number for the user equipment based on signal to noise ratio; and transmitting the transmission repetition number to the user equipment.

In a further embodiment of the present disclosure, the method may further comprise transmitting a power boosting parameter to the user equipment; and wherein the new-type reference signal is transmitted at a boosted power indicated by the power boosting parameter.

In a yet embodiment of the present disclosure, the new-type reference signal may be transmitted when a physical downlink shared channel resource is scheduled for the user equipment.

In a still embodiment of the present disclosure, the legacy reference signal may comprise any one of a cell specific reference signal and a demodulation reference signal.

In a still further embodiment of the present disclosure, the method is performed in response to a coverage enhancement indication for the user equipment.

In a yet further embodiment of the present disclosure, sending to the user equipment an antenna ports count indicating an antenna port number for transmitting the new-type reference signal and the legacy reference signal.

According to a second aspect of the present disclosure, there is also provided method for downlink data transmission in a wireless communication system, comprising: receiving an indication for a new-type reference signal, wherein the new-type reference signal has an identical location in frequency domain to a legacy reference signal; receiving the new-type reference signal and the legacy reference signal according to the indication; and performing channel estimation based on both the new-type reference signal and the legacy reference signal.

According to a third aspect of the present disclosure, there is further provided an apparatus for downlink data transmission in a wireless communication system. The apparatus may comprise an indication transmission unit, configured to transmit an indication for a new-type reference signal to a user equipment, wherein the new-type reference signal has an identical location in frequency domain to a legacy reference signal; and a reference signal transmission unit configured to transmit the new-type reference signal and the legacy reference signal to the user equipment for using in channel estimation.

According to a fourth aspect of the present disclosure, there is further provided an apparatus for downlink data transmission in a wireless communication system. The apparatus may comprise an indication receiving unit configured to receive an indication for a new-type reference signal, wherein the new-type reference signal has an identical location in frequency domain to a legacy reference signal; a reference signal receiving unit configured to receive the new-type reference signal and the legacy reference signal in according to the indication; and a channel estimation unit configured to perform channel estimation based on both the new-type reference signal and the legacy reference signal.

According to a fifth aspect of the present disclosure, there is provided a method for uplink data transmission in a wireless communication system. The method may comprise transmitting an indication for a new-type reference signal to a user equipment, wherein the new-type reference signal has an identical location in frequency domain to a legacy reference signal; receiving the new-type reference signal and the legacy reference signal from the user equipment; and performing channel estimation based on both the new-type reference signal and the legacy reference signal.

According to a sixth aspect of the present disclosure, there is provided another method for uplink data transmission in a wireless communication system. The method may comprise receiving an indication for a new-type reference signal from a base station, wherein the new-type reference signal has an identical location in frequency domain to a legacy reference signal; and transmitting the new-type reference signal and the legacy reference signal to the base station for using in channel estimation.

According to a seventh aspect of the present disclosure, there is provided an apparatus for uplink data transmission in a wireless communication system. The apparatus may comprise an indication transmission unit configured to transmit an indication for a new-type reference signal to a user equipment, wherein the new-type reference signal has an identical location in frequency domain to a legacy reference signal; a reference signal receiving unit configured to receive the new-type reference signal and the legacy reference signal from the user equipment; and a channel estimation unit configured to perform channel estimation based on both the new-type reference signal and the legacy reference signal.

According to an eighth aspect of the present disclosure, there is provided another apparatus for uplink data transmission in a wireless communication system. The apparatus may comprise indication receiving unit configured to receive an indication for a new-type reference signal from a base station, wherein the new-type reference signal has an identical location in frequency domain to a legacy reference signal; and a reference signal transmission unit configured to transmit the new-type reference signal and the legacy reference signal to the base station for using in channel estimation.

According to a ninth aspect of the present disclosure, there is further provided, a computer-readable storage media with computer program code embodied thereon, the computer program code configured to, when executed, cause an apparatus to perform actions in the method according to any embodiment in any one of the first, second, fifth and sixth aspects.

According to a tenth aspect of the present disclosure, there is provided a computer program product comprising a computer-readable storage media according to the ninth aspect.

In embodiments of the present disclosure, there is provided a data transmission solution in wireless communication. With embodiments of the present disclosure, it is possible performed channel estimation by combining both CRS and the new-type reference signal as proposed in the present disclosure and thus it may improve the accuracy of channel estimation. Accordingly, it may support UE with a low SNR in LTE networks which reduce reliance on the older communication networks such as GSM/GPRS networks.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein.

DETAILED DESCRIPTION OF EMBODIMENTS

Figure 1A:
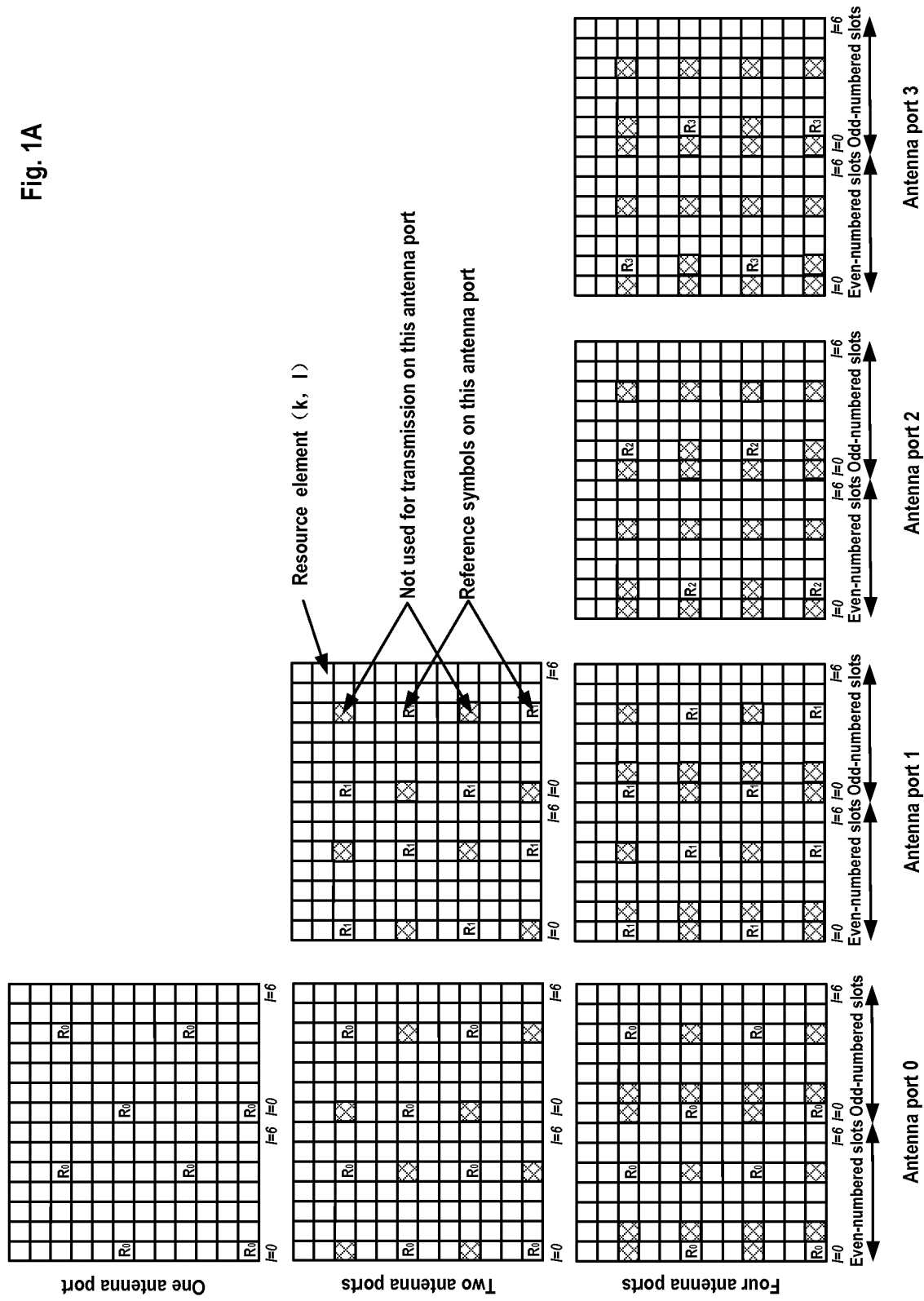
FIG. 1A schematically illustrates a mapping of downlink reference signals (normal cyclic prefix) in Rel. 8.
Figure 1B:
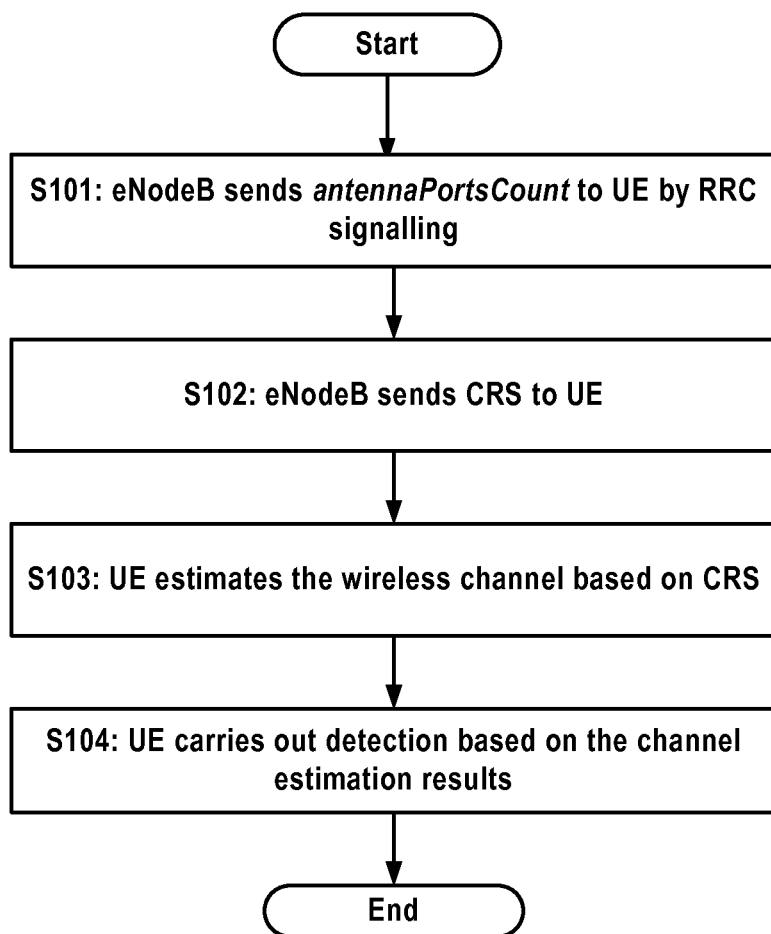
FIG. 1B schematically illustrates CRS configuration based Rel. 8.
Figure 2A:
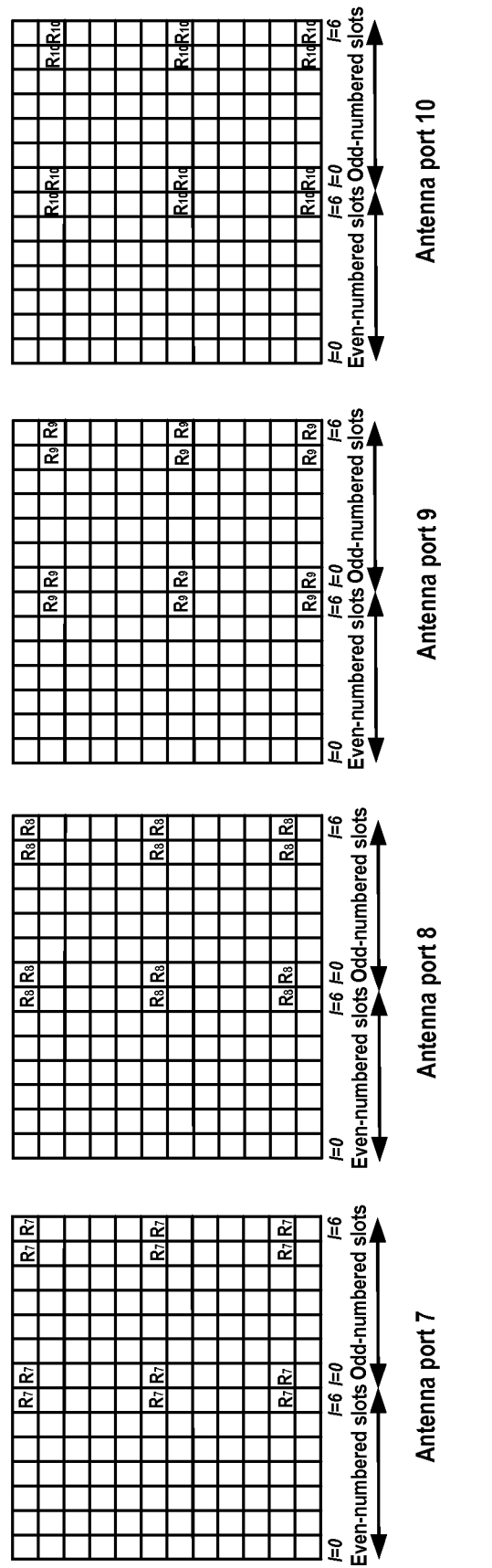
FIG. 2A schematically illustrates a mapping of UE-specific reference signals, antenna ports 7, 8, 9 and 10 (normal cyclic prefix) as specified in Rel. 10.
Figure 2B:
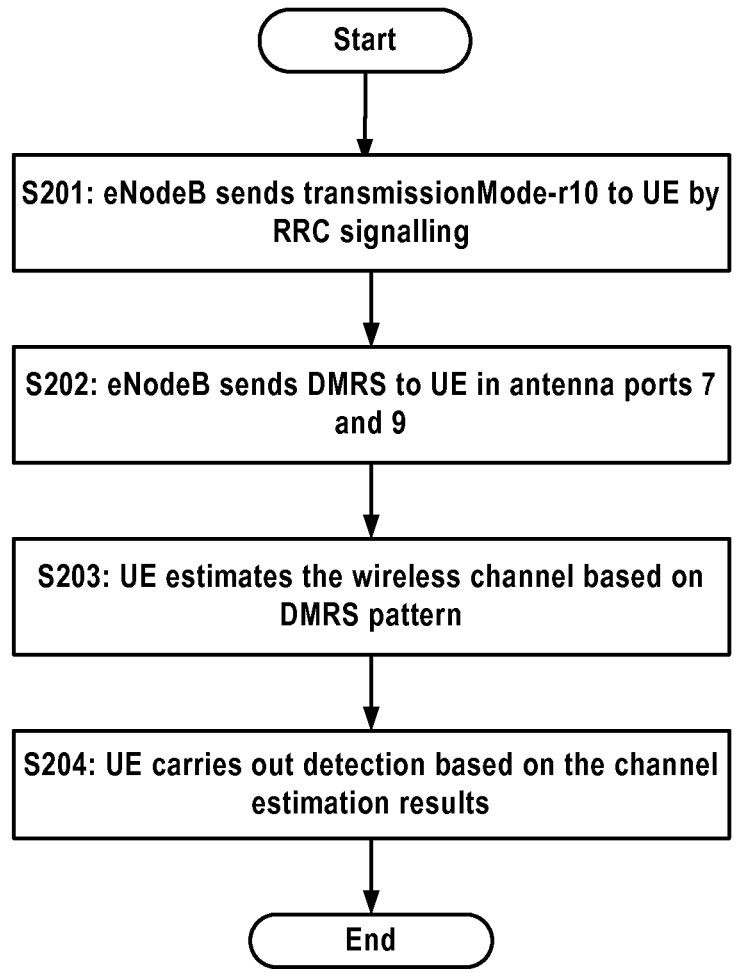
FIG. 2B schematically illustrates DMRS configuration based Rel. 10.

Hereinafter, a method and apparatus for data transmission in a wireless communication system will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or block may represent a module, a program, or a part of code, which contains one or more executable instructions for performing specified logic functions and indispensible block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

For a better understanding of the present disclosure, the following description will be made to embodiments of the present disclosure by taking MTC as an example. However, as can be appreciated by those skilled in the art, the present invention could be applied to any other suitable communication with a low SNR.

Figure 3A:
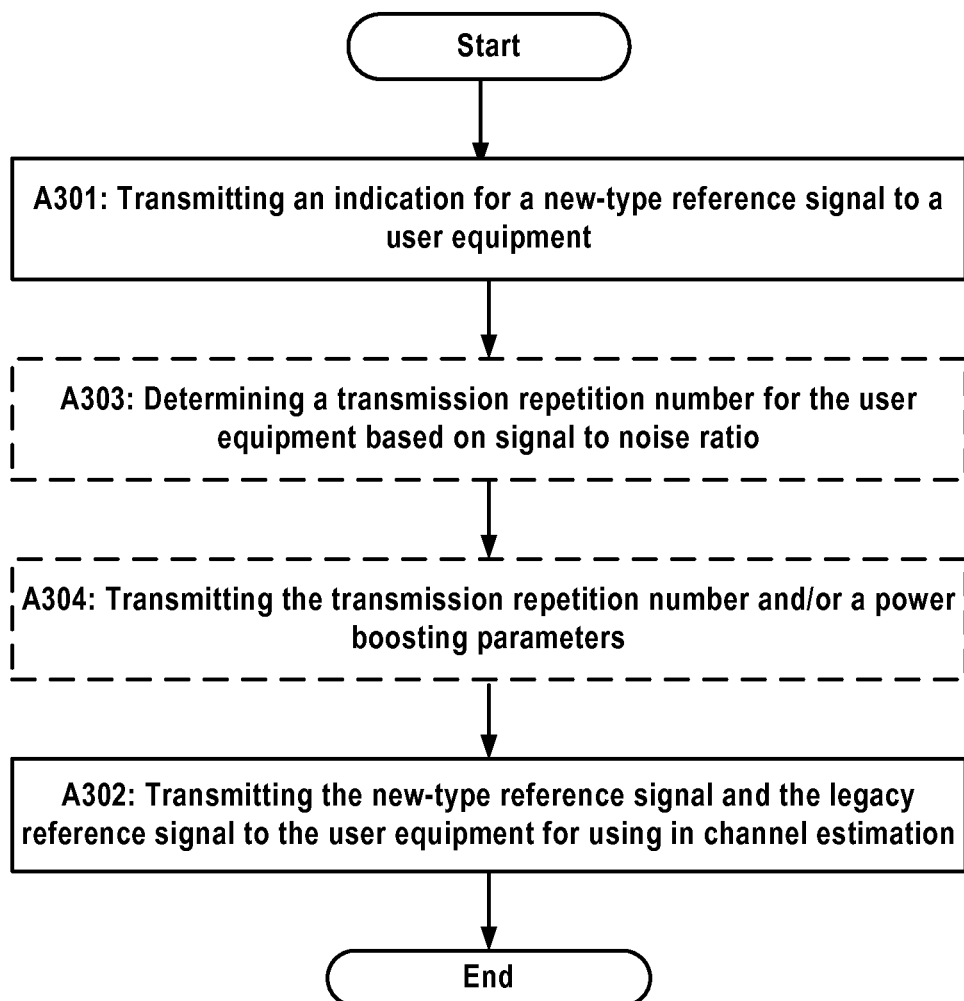
FIG. 3A schematically illustrates a flowchart of a method for downlink data transmission at an eNB in a wireless communication system according to an embodiment of the present disclosure.

First, reference will made to FIG. 3A to describe a method for downlink data transmission at an eNB in a wireless communication system according to an embodiment of the present disclosure.

As illustrated, first at step A301, the eNB may transmit an indication for a new-type reference signal to a user equipment.

As mentioned in background, CRS pattern in Rel. 8 is designed for medium or high SNR while in DMRS pattern, only a part of ports can be used, thus they are not suitable for communication with a low SNR such as MTC. Moreover, it is impossible to use the two reference signal patterns together because they can not be aligned with each other in frequency domain.

In view of this, in the present disclosure, there is proposed a new-type reference signal, which may be called as MTCRS. The main idea is to increase the density of reference symbols in resource elements. In an embodiment of the present invention, the new-type reference signal may be designed so that the new-type reference signal has an identical location in frequency domain to a legacy reference signal such as CRS or DMRS. That is to say, the new-type reference signal is shifting in a similar way to the legacy reference signal. In such as way, not only the density of reference symbols is increased, but also the newly added reference symbols may be used to perform channel estimation together with the legacy reference signal. This means more resource elements may be use to transmit reference symbols while it may be compatible in existing LTE networks.

Additionally, when more than one antenna port is used to transmit reference symbols, the new-type reference may be further designed so that it has a different location in time domain from the legacy reference signal so as to avoid interference to other antenna ports, i.e., the legacy reference signal and the new-type reference will be staggered in time domain. More exemplary patterns of MTCRS will be described hereinafter.

The eNB may transmit the indication by, for example, an Radio Resource Control (RRC) signalling or any other suitable signalling such as physical layer signalling. Besides, as usual, before transmitting the indication, the eNB may first send antennaPortsCount to all UEs that it serves by (RRC) signaling; however, the antennaPortsCount will represent the antenna port numbers for both the legacy reference signal and the antenna port number for the new-type reference signal MTCRS. For example, the RRC configuration containing antennaPortsCount may be transmitted to the UE, wherein it may also include a transmission mode: transmissionMode-r10 to inform the UE the transmission mode that is used by the eNB.

Then at step A302, the eNB sends both the legacy reference signal such as CRS or DMRS and the new-type reference signal MTCRS to the UE for using in the channel estimation. In such a way, the UE may use both the legacy reference signal and the new-type reference signal MTCRS to perform jointly a channel estimation.

Besides, at step A303, the eNB may determine a transmission repetition number for the UE based on signal to noise ratio. Specifically, the eNB may first estimate the SNR for the UE, then by looking up a pre-defined relationship curve between the repetition number and SNR, it may obtain a repetition number corresponding to the estimated SNR and this obtained repetition number may be estimated as the repetition number N for the UE.

After that, the eNB may transmit at step A304 the transmission repetition number N to the UE, so that UE can learn the transmission repetition number and demodulate the signals based thereon. That is to say the UE may learn the right time for beginning to demodulate signal. Therefore, the UE will not perform demodulation until it has received packets with an amount equal to the transmission repetition number, or in other words, the UE keeps waiting before enough packets arrive.

Additionally, it may additionally apply power boosting to increase the intensity of reference symbols, thereby achieving a further converge enhancement. To do this, the eNB may determine a power boosting parameter which indicates the boosted power for transmit the new-type reference signal MTCRS and the power boosting parameter may be transmitted to the UE at step A304 so that the UE can know the power boosting parameter. In such a way, the UE may use the information about the power boosting parameter in channel estimation. For example, the power boosting parameter $\rho_D$ may indicate energy per resource element (EPRE) to the CRS EPER. Usually, the UE knows the CRS EPRE, and thus the power of MTCRS may be determined based on the power of CRS and the power boosting parameters $\rho_D$. Additionally, the power boosting parameter may be also defined relative the physical downlink shared channel resource (PDSCH).

In some embodiments of the present disclosure, the new-type reference signal may be sent in a UE-specific way, i.e., the new-type reference signal may be sent only when the PDSCH is scheduled for the user equipment. Therefore, it is possible to configure a UE individually in terms of the new-type reference signal. If the legacy reference signal may also be sent in a UE-specific way (for example for DMRS), the legacy reference signal may also be transmitted only when the PDSCH is scheduled for the user equipment.

Additionally, the method may be performed only when the UE needs coverage enhancement. Therefore, in embodiments of the present invention, the method is performed in response to a coverage enhancement indication for the user equipment. When the UE does not require coverage enhancement indication, the method may not be performed.

Furthermore, as mentioned hereinabove, the eNB may send the antenna port number to the UE to inform the antenna port on which the new-type reference signal is transmitted. For example, the eNB may send a parameter antennaPortsCount to the UE, which indicates antenna port numbers for transmitting the new-type reference signal and the legacy reference signal. In such way, the UE may learn antenna port information so that it can obtain the new-type reference signal therefrom. However, it may also be feasible without sending the antenna port number by using predetermined antenna ports which are know to both the eNB and the UE.

Hereinafter, a method for downlink data transmission at a UE in a wireless communication system according to an embodiment of the present disclosure will be described with reference to FIG. 3B.

As illustrated, in step B301, the UE will receive an indication for the new-type reference signal from the base station. From this indication, the UE may know that, in addition to the legacy reference signal such as CRS or DMRS, a new-type reference signal MTCRS will be transmitted from the base station. Hence, at step B302 the UE will receive, according the received indication, both the new-type reference signal and the legacy reference signal. The UE may receive these reference signals on antenna ports for example indicated by parameter antennaPortsCount which is also transmitted from the eNB.

As described previously, the new-type reference signal is a reference signal different from the legacy reference signal, and it may be designed so that the new-type reference signal has an identical location in frequency domain as a legacy reference signal such as CRS or DMRS. Additionally, when more than one antenna port is used, the new-type reference may be further designed so that it has a different location in time domain from a legacy reference signal, i.e., the legacy reference signal and the new-type reference will be staggered in time domain. Due to such a special design for the new-type signal, the UE may combine the new-type reference signal and the legacy reference signal together to perform channel estimation at step B303.

Additionally, the UE may further receive a transmission repetition number from the eNB at step B304, and thus the UE can demodulate signals based on the transmission repetition number. For example, only when it has received packets with an amount equal to the transmission repetition number, the UE will start signal demodulation.

Figure 3B:
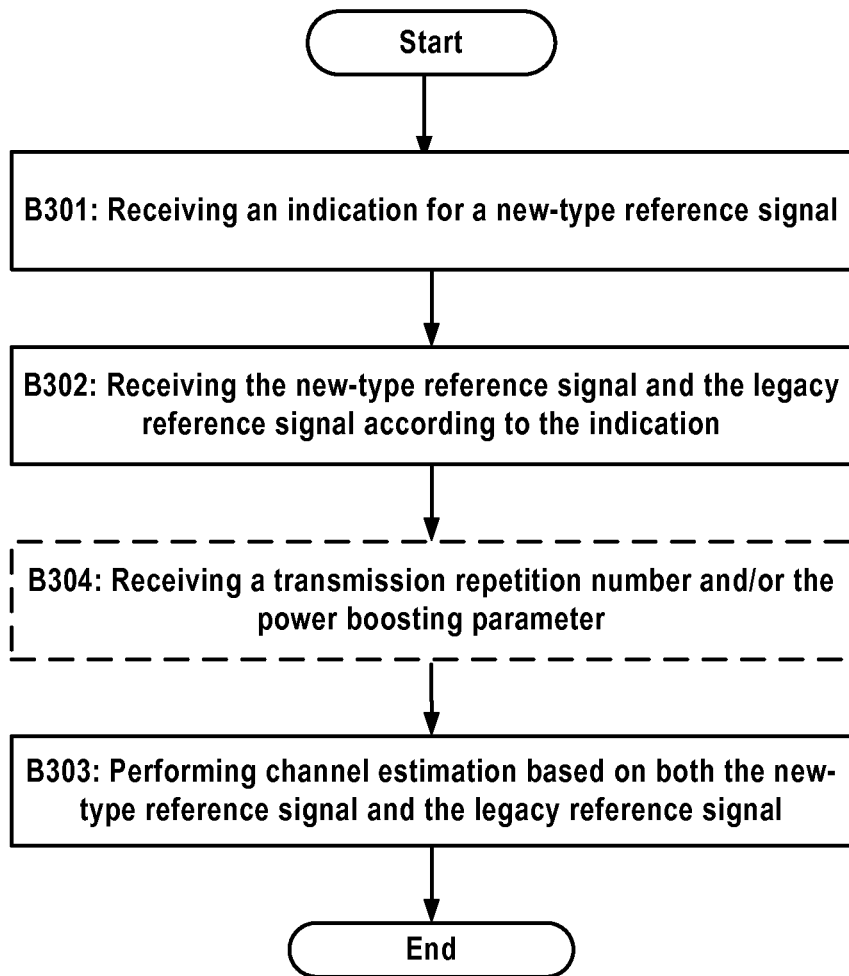
FIG. 3B schematically illustrates a flowchart of a method for downlink data transmission at a UE in a wireless communication system according to an embodiment of the present disclosure.

Likely that at the eNB, the method as illustrated in FIG. 3B may also be performed when the UE requires coverage enhancement.

Besides, in the present disclosure, there are also provided methods for uplink data transmission in a wireless communication system, which will be described with reference to FIGS. 4A and 4B.

Figure 4A:
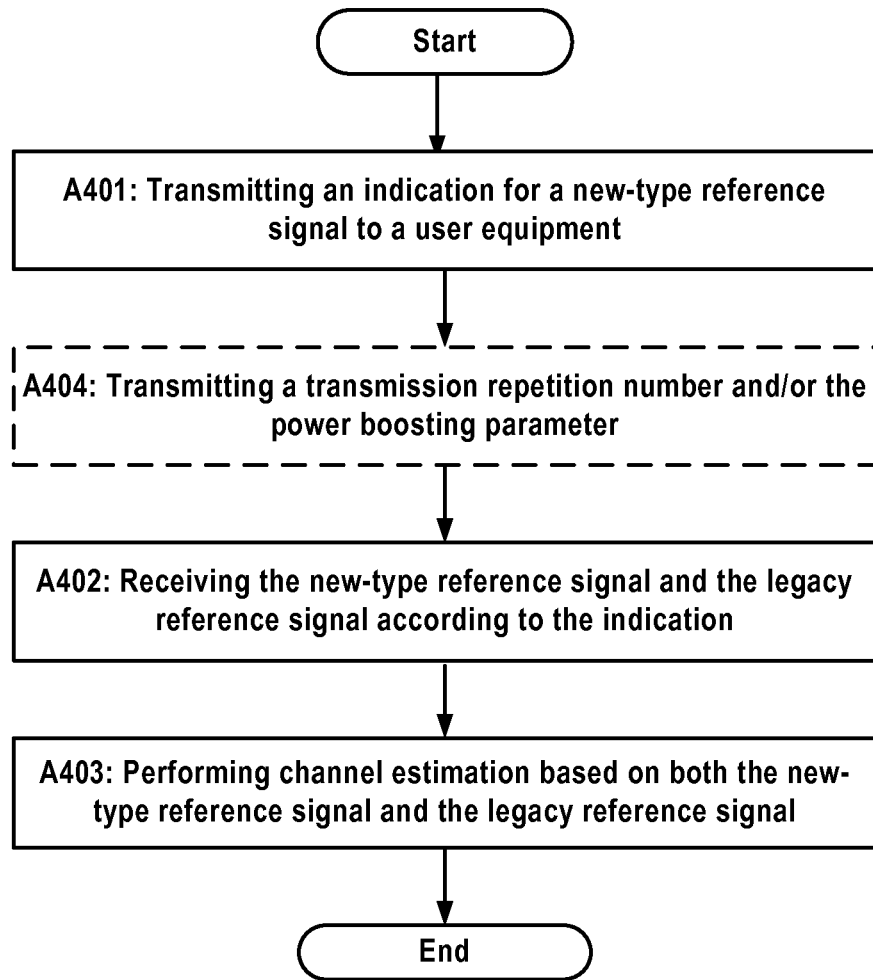
FIG. 4A schematically illustrates a flowchart of a method for uplink data transmission at an eNB in a wireless communication system according to an embodiment of the present disclosure.

FIG. 4A schematically illustrate a flowchart of a method for uplink data transmission at an eNB in a wireless communication system according to an embodiment of the present disclosure. As illustrated in FIG. 4A, first at step A401, the eNB transmits an indication for a new-type reference signal to a user equipment. As mentioned hereinbefore, the new-type reference signal may be designed so that the new-type reference signal has an identical location in frequency domain as a legacy reference signal such as DMRS. The new-type reference signal may further have different location in time domain, i.e., they are staggered in time domain. An exemplary MTCRS pattern for MTC will be described hereinafter.

The indication may also be transmitted by for example, RRC signalling or any other suitable signalling such as physical layer signalling. Furthermore, the eNB may send the antenna port number to the UE to inform the antenna port on which the reference signals are transmitted. For example, the eNB may send a parameter antennaPortsCount to the UE, which indicates antenna port numbers for transmitting the new-type reference signal and the legacy reference signal. In such way, the UE may learn antenna port information so that it can transmit the reference signals thereon.

Next, at step A402, the eNB may receive the new-type reference signal and the legacy reference signal from the UE on the antenna ports for example indicated by the parameter antennaPortsCount. Afterwards, at step A403, the eNB may perform channel estimation based on the received new-type reference signal and the received legacy reference signal.

Additionally, at step A404, the eNB may further determine a transmission repetition number for the UE based on signal to noise ratio and transmit the transmission repetition number to the UE, so that UE can learn the transmission repetition number and demodulate the signals when it has received packets with an amount equal to the transmission repetition number.

Besides, the method may be also performed only when the UE needs coverage enhancement. Therefore, in embodiments of the present invention, the method is performed in response to a coverage enhancement indication for the user equipment while the method may be not performed when the UE does not require coverage enhancement indication.

Figure 4B:
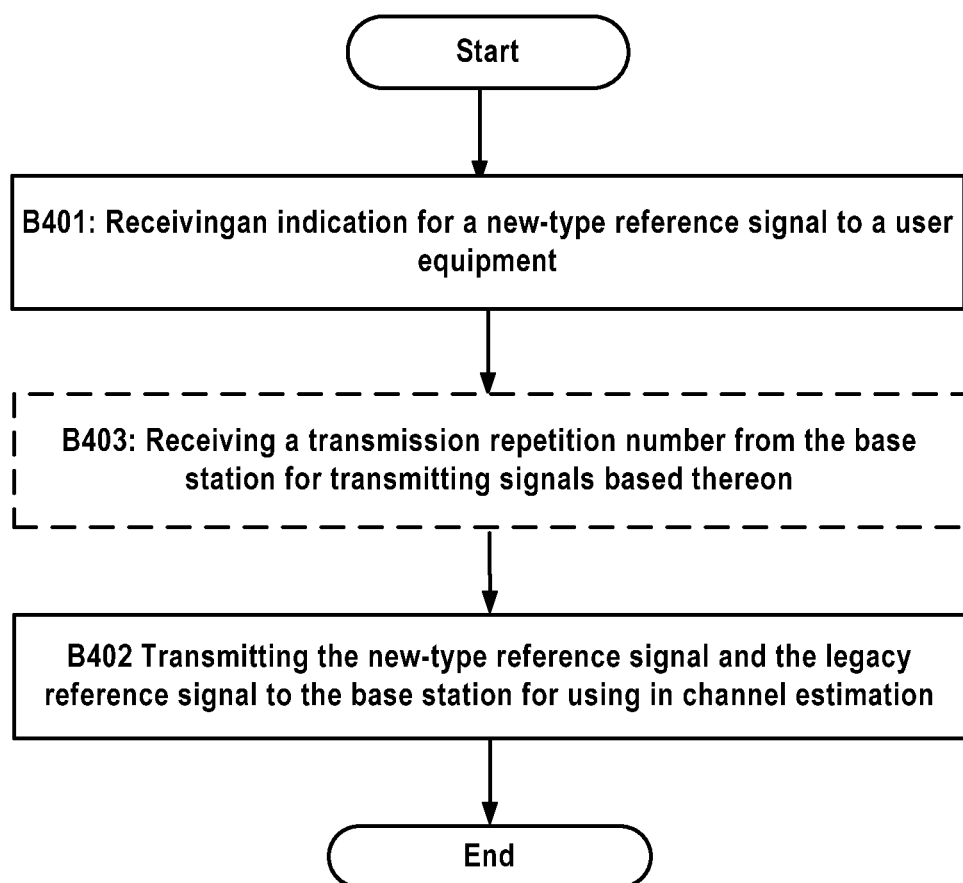
FIG. 4B schematically illustrates a flowchart of a method for uplink data transmission at a UE in a wireless communication system according to an embodiment of the present disclosure.

FIG. 4B schematically illustrates a flowchart of a method for uplink data transmission at a UE in a wireless communication system according to embodiments of the present disclosure. As illustrated in FIG. 4B, first at step B401, the UE receives an indication for the new-type reference signal MTCRS. From this indication, the UE may know that, in addition to the legacy reference signal such as DMRS, it should transmit a new-type reference signal MTCRS to the base station. Then at step B402, the UE will transmit both the legacy reference signal and a new-type reference signal MTCRS to the eNB for using in channel estimation. The new-type reference signal may be transmitted in a UE-specific way. For example, it may be transmitted only when a physical uplink shared channel resource (PUSCH) is scheduled for the user equipment. Similarly, if the legacy reference signal may also be sent in a UE-specific way (for example for DMRS), the legacy reference signal may also be transmitted only when the PUSCH is scheduled for the user equipment.

Additionally, the UE may also receive a transmission repetition number from the base station at step B403. In such a way, the UE may transmit signals based on the transmission repetition number. Moreover, the method as illustrated in FIG. 4B may be performed in response to a coverage enhancement indication for the user equipment. In other words, the method will be performed only when the UE requires coverage enhancement.

Besides, before transmitting the reference signals, the UE may receive from the eNB an antenna ports count that indicates an antenna port number for transmitting the new-type reference signal and the legacy reference signal so that the UE can learn use which antenna ports to use for transmitting the reference signals. However, it should be appreciated that it may also be feasible to use pre-determined antenna ports known to both the eNB and the UE.

Hereinbefore, some embodiments of the present disclosure have been described with reference to FIGS. 3A, 3B, 4A and 4B, and in the following some specific examples will be described to enable the skilled in the art to well understand the idea of the present invention.

Figure 5A:
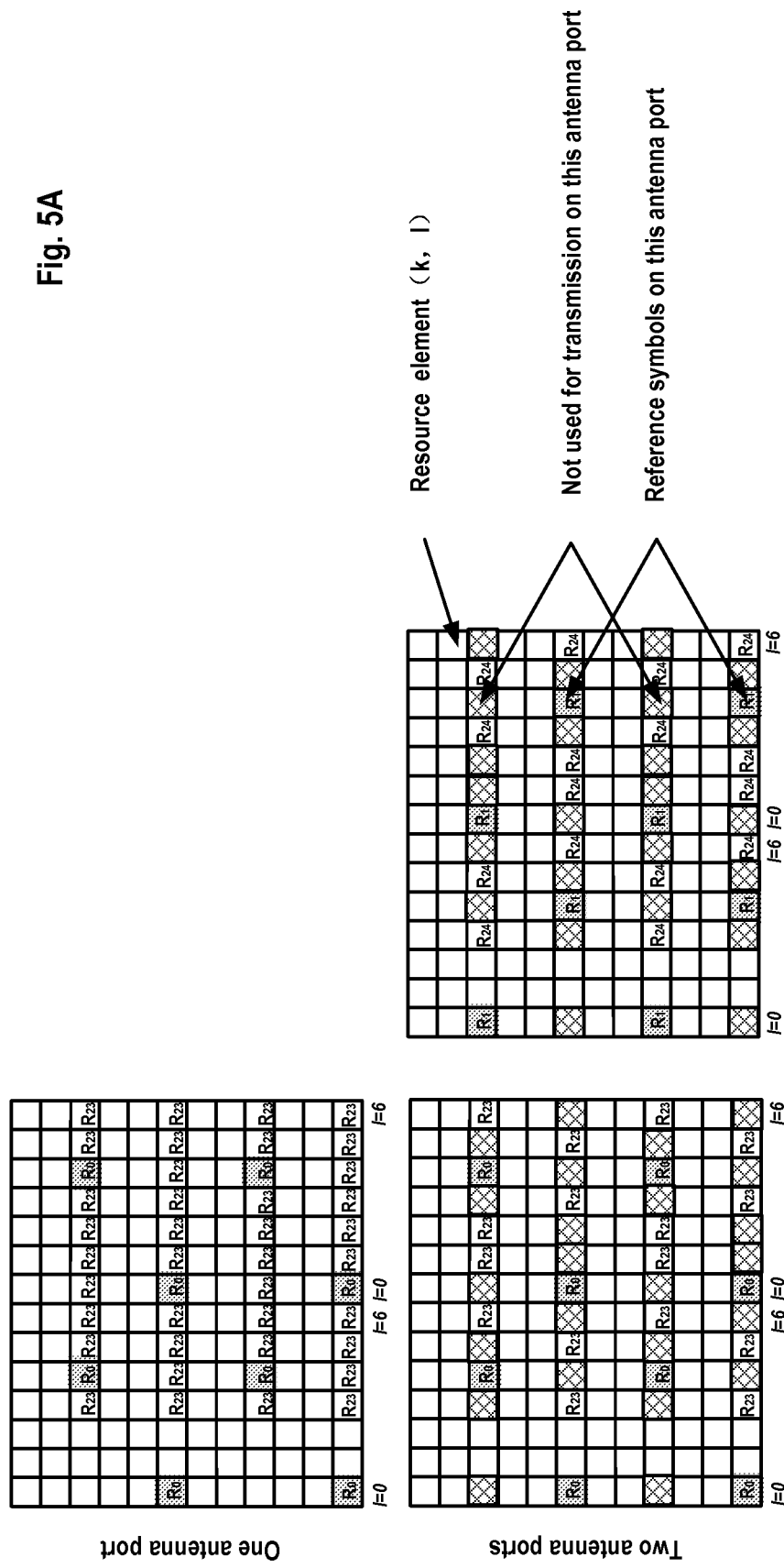
FIG. 5A schematically illustrates exemplary downlink MTCRS patterns for MTC with one antenna port and two antenna ports respectively according to an embodiment of the present disclosure.
Figure 5B:
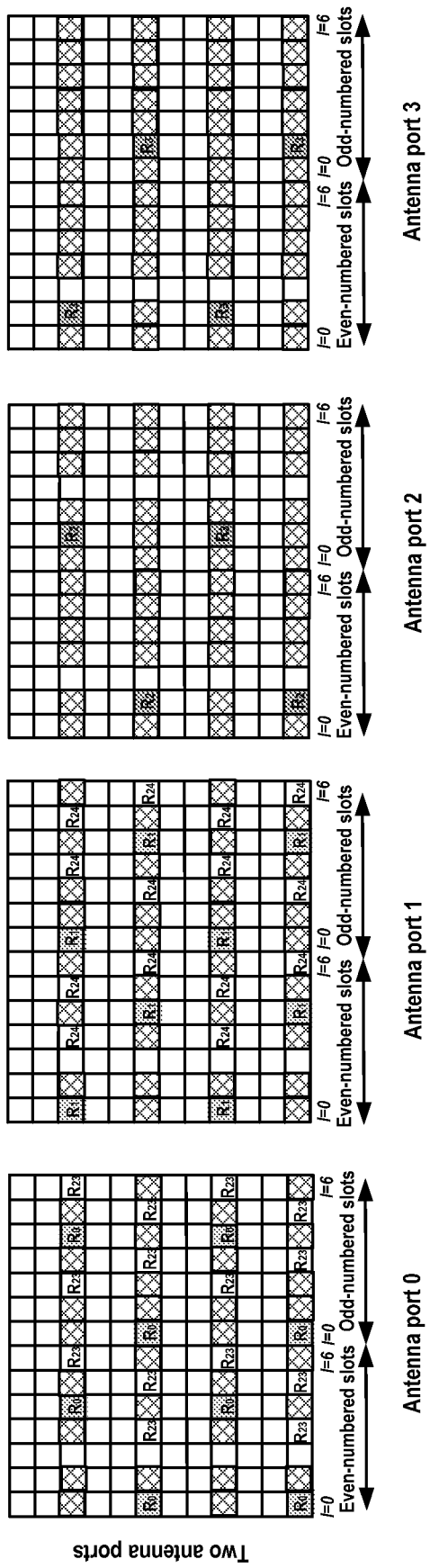
FIG. 5B schematically illustrates an exemplary downlink MTCRS pattern for MTC with four antenna ports according to an embodiment of the present disclosure.

FIGS. 5A and 5B schematically illustrate exemplary downlink MTCRS patterns for MTC with one antenna port, two antenna ports and four antenna ports respectively, wherein reference signal ports 23 and 24 are newly added ports.

For one antenna port, it may be seen that besides original resource reference symbols $R_0$ which are shown in a dark background, there is further provided a new reference symbol $R_{23}$ which will be also transmitted on antenna port 1. It is clear that all reference symbols $R_{23}$ have similar locations to the original reference symbols $R_0$ in frequency domain i.e., they are shifting in a similar way to the reference symbols $R_0$. Except the first three time slots for public control channel, reference symbols $R_{23}$ may occupy four subcarriers in all time slots as long as these subcarriers are not occupied by reference symbols $R_0$. However, it may be appreciated that MTCRS may be arranged in other ways, such as reference symbols $R_{23}$ may occupy only part of these subcarriers and/or part of the time slots. Additionally, it may be also appreciated that it is also possible to arrange reference symbols $R_{23}$ in the first three time slots.

From FIG. 5A, it may also be seen that, for two antenna ports, there are newly added two reference signal ports 23 and 24 instead of only one antenna port 23. All reference symbols $R_{23}$ and $R_{24}$ have similar locations to the original reference symbols $R_0$ and $R_1$ in frequency domain i.e., they are shifting in a similar way to the reference symbols $R_0$ and $R_1$, respectively. Except the first three time slots and the time slots already occupied by reference symbols $R_0$ and $R_1$, reference symbols $R_{23}$ and $R_{24}$ occupies all of the remaining eight time slots. And it may also be clear that in each time slot that reference symbols $R_{23}$ and $R_{24}$ occupy, reference symbols $R_{23}$ and $R_{24}$ have different locations in frequency domain so as to avoid interference with each other. However, it should be noted that many other MTCRS patterns are possible, for example, reference symbols $R_{23}$ and $R_{24}$ may occupy part of the eight remaining time slots (for example four or six of the remaining time slots), occupy part of possible subcarriers in a time slot, etc.

FIG. 5B schematically illustrates an exemplary downlink MTCRS pattern for MTC with four antenna ports. As is clear from FIG. 5B, the antenna port 0 and the antenna port 1 have generally similar pattern as those illustrated in FIG. 5A for two antenna ports, but in order to avoid interference, in antenna ports 0 and 1, those time slots occupied by reference symbols R$_2$ and R$_3$ are forbidden to use by reference symbols R$_{23}$ and R$_{24}$, and in antenna ports 2 and 3, subcarriers corresponding to those reference symbols R$_{23}$ and R$_{24}$ have been forbidden to use too.

Figure 6:
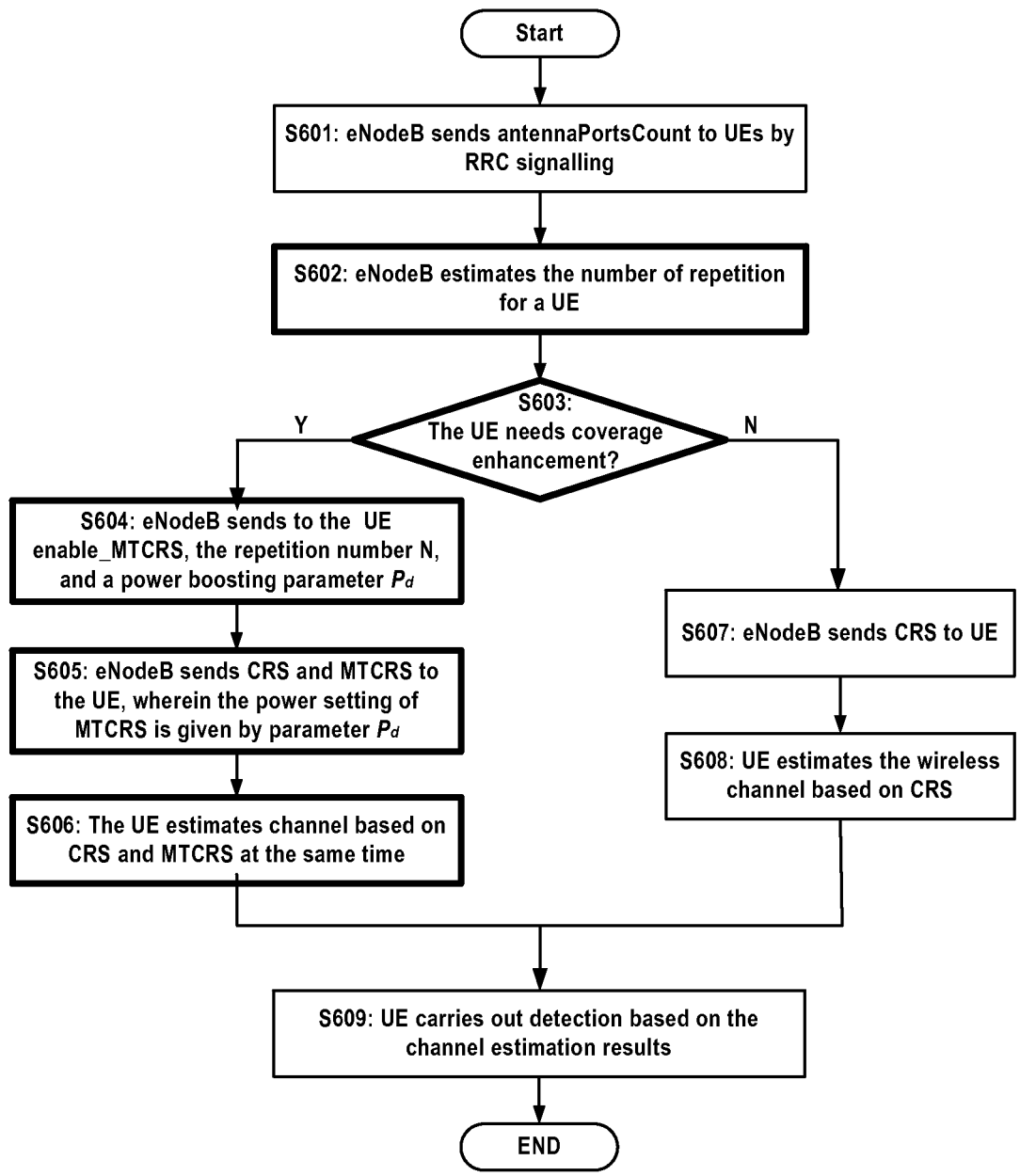
FIG. 6 schematically illustrates a flow chart of a method for reference signal configuration according to an embodiment of the present disclosure.

FIG. 6 illustrates a flow chart of a method for reference signals configuration according to an embodiment of the present disclosure wherein operations specific to the present disclosure are highlighted by blocks in bold lines.

As illustrated in FIG. 6, at step S601, the eNB sends a parameter antennaPortsCount to all UEs by RRC signaling as usual. The parameter antennaPortsCount contains information for indicating antenna ports for transmitting reference signals, for example antenna port 0, antenna ports 1 and 2, or antenna ports 0 to 3, etc. Then at step S602, eNB may estimate the transmission repetition number for the UE. Specifically, the eNB first estimate SNR of the UE and then it may determine the repetition number N based on the estimated SNR and a predetermined relationship curve of the SNR and the repetition number. For example, by looking up the predetermined relationship curve, it may find a repetition number corresponding to the estimated SNR, which may be determined as the transmission repetition number for the UE.

After that, at step S603, the eNB may determine whether the UE needs coverage enhancement. For example, if the estimated SNR is lower than a predetermined threshold, it may determine the UE needs coverage enhancement, or the UE belongs to a type of UE with a low SNR. If the UE does need coverage enhancement, then the procedure proceeds into step S604, at which the eNB sends an enable MTCRS indication to the UE to indicate that the MTCRS will be used in addition to the traditional reference signal such as CRS or DMRS. Additionally, the eNB may transmit to the UE the estimated repetition number N so that the UE may obtain the repletion number for using in demodulation. In addition, the eNB may also send a boosting parameter $\rho_D$ to the UE so that the UE can know the EPRE of MTCRS.

Then, the eNB may generate the MTCRS sequence. The MTCRS may be generated in a same way as CRS in Section 6.10.1 of TS 36.211 but with a different mapping to resource elements. For the MTCRS patterns as illustrated and in FIG. 5A and FIG. 5B, the reference signal sequence $r_{l,n,MTC}(m)$ may be mapped to complex-valued modulation symbols $a_{k,l,MTC}^{(p)}$ used as reference symbols for antenna port p in slot $n_s$ according to the following equation:

$$a_{k,l,MTC}^{(p)} = r_{l,n_s,MTC}(m')$$

wherein $$k = 6m + (v + v_{shift}) \bmod 6;$$

$$m = 0, 1, \ldots, 2 \cdot N_{RB}^{DL} - 1; \text{ and}$$

$$m' = n + N_{RB}^{max,DL} - N_{RB}^{DL}$$

if $p = 1$ $$l = \begin{cases} 3, 4, 5, 6 & \text{if } n_s \bmod 2 = 0 \\ 0, 1, 2, 3, 4, 5, 6 & \text{if } n_s \bmod 2 = 1 \end{cases}$$

$$v = \begin{cases} 0 & l = 3, 4, 5, 6 \text{ and } n_s \bmod 2 = 0 \\ 3 & l = 3, 5, 6 \text{ and } n_s \bmod 2 = 0 \\ 0 & l = 1, 2, 3, 4, 5, 6 \text{ and } n_s \bmod 2 = 1 \\ 3 & l = 0, 1, 2, 3, 5, 6 \text{ and } n_s \bmod 2 = 1 \end{cases}$$

if $p = 2$ $$l = \begin{cases} 3, 5, 6 & \text{if } n_s \bmod 2 = 0 \\ 1, 2, 3, 5, 6 & \text{if } n_s \bmod 2 = 1 \end{cases}$$

$$v = \begin{cases} 0 & \text{if } p = 0 \text{ and } l = 3, 5 \text{ and } n_s \bmod 2 = 0 \\ 3 & \text{if } p = 0 \text{ and } l = 6 \text{ and } n_s \bmod 2 = 0 \\ 0 & \text{if } p = 0 \text{ and } l = 3, 5 \text{ and } n_s \bmod 2 = 1 \\ 3 & \text{if } p = 0 \text{ and } l = 1, 2, 6 \text{ and } n_s \bmod 2 = 1 \\ 0 & \text{if } p = 1 \text{ and } l = 3, 5 \text{ and } n_s \bmod 2 = 0 \\ 3 & \text{if } p = 1 \text{ and } l = 6 \text{ and } n_s \bmod 2 = 0 \\ 0 & \text{if } p = 1 \text{ and } l = 3, 5 \text{ and } n_s \bmod 2 = 1 \\ 3 & \text{if } p = 1 \text{ and } l = 1, 2, 6 \text{ and } n_s \bmod 2 = 1 \end{cases}$$

if $p = 4$ $$l = \begin{cases} 3, 5, 6 & \text{if } n_s \bmod 2 = 0 \\ 2, 3, 5, 6 & \text{if } n_s \bmod 2 = 1 \end{cases}$$

$$v = \begin{cases} 0 & \text{if } p = 0 \text{ and } l = 3, 5 \text{ and } n_s \bmod 2 = 0 \\ 3 & \text{if } p = 0 \text{ and } l = 6 \text{ and } n_s \bmod 2 = 0 \\ 0 & \text{if } p = 0 \text{ and } l = 3, 5 \text{ and } n_s \bmod 2 = 1 \\ 3 & \text{if } p = 0 \text{ and } l = 2, 6 \text{ and } n_s \bmod 2 = 1 \\ 0 & \text{if } p = 1 \text{ and } l = 3, 5 \text{ and } n_s \bmod 2 = 0 \\ 3 & \text{if } p = 1 \text{ and } l = 6 \text{ and } n_s \bmod 2 = 0 \\ 0 & \text{if } p = 1 \text{ and } l = 3, 5 \text{ and } n_s \bmod 2 = 1 \\ 3 & \text{if } p = 1 \text{ and } l = 2, 6 \text{ and } n_s \bmod 2 = 1 \end{cases}$$

wherein k denotes an index of a resource element in a frequency domain, l denotes an index of a resource element in a time domain, $n_s$ denotes an index of the time slots; p denotes the number of antenna ports for transmitting reference signals; m denotes an index of the reference symbols; m' denotes the index of the generated sequence; v denotes the frequency domain position of a reference signal and "mod" denotes a mod operation. In accordance with the given mapping, MTCRS sequence generation may be implemented in a similar way to that for the CRS.

Next, the eNB sends both the generated CRS and MTCRS to the UE at step S605. The power setting of the MTCRS may be determined by the power boosting parameter $\rho_D$, i.e., the MTCRS will be transmitted at a boosted power indicated by the power boosting parameter $\rho_D$. The MTCRS may be sent in a UE-specific way, i.e., they may be sent only when the physical downlink control channel is scheduled for the UE.

So the UE may obtain the CRS and MTCRS on one or more antenna ports indicated by antennaPortsCount according to the enable MTCRS indication. Thus, the UE may estimate channel based on both CRS and MTCRS at the same time. Since there is additionally provided a MTCRS, the intensity of references symbols is increased which means more reference symbols may be to be transmitted at a time, thus the accuracy of channel estimation in a lower SNR may be improved.

On the other hand, if the UE does not require coverage enhancement, the procedure may proceed into step 607 and eNB sends only CRS to the UE. Since the UE has received the RRC configuration, it knows the CRS configuration and thus it may estimate channel based on CRS pattern at step S608. Then, at step S609, the UE may carry out detection based on channel estimation results.

Figure 7:
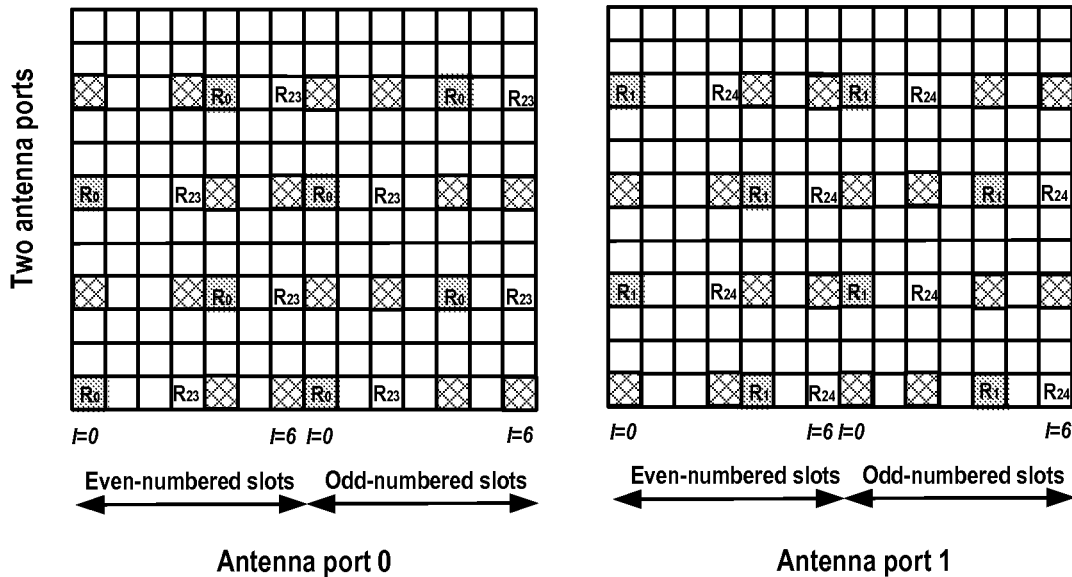
FIG. 7 schematically illustrates another exemplary downlink MTCRS pattern for MTC with two antennae according to an embodiment of the present disclosure.

Beside, FIG. 7 schematically illustrates another exemplary downlink MTCRS pattern for MTC with two antennae according to an embodiment of the present disclosure. As illustrated, reference symbols $R_{23}$ and $R_{24}$ also have similar locations to the original reference symbols $R_0$ and $R_1$ in frequency domain and in each time slot reference symbols $R_{23}$ and $R_{24}$ have different locations in frequency domain so as to avoid interference with each other. However, different from MTCRS for two antenna ports as illustrated in FIG. 5A, reference symbols $R_{23}$ and $R_{24}$ are much sparser and they occupy only a half of the time slots that occupied by reference symbols R23 and R24 as illustrated in FIG. 5A.

Figure 8:
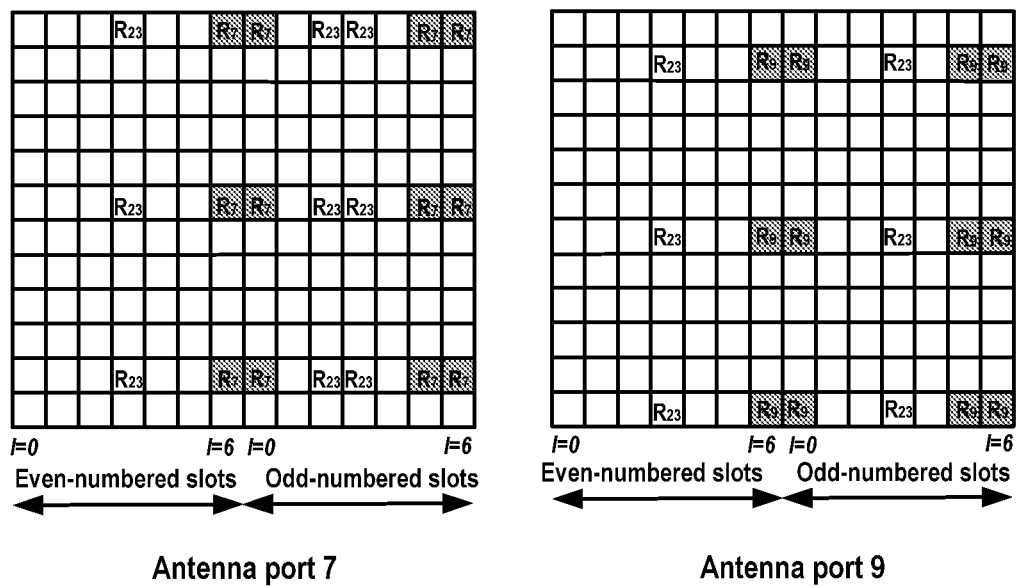
FIG. 8 schematically illustrates a further exemplary downlink MTCRS pattern for MTC according to an embodiment of the present disclosure.
Figure 9:
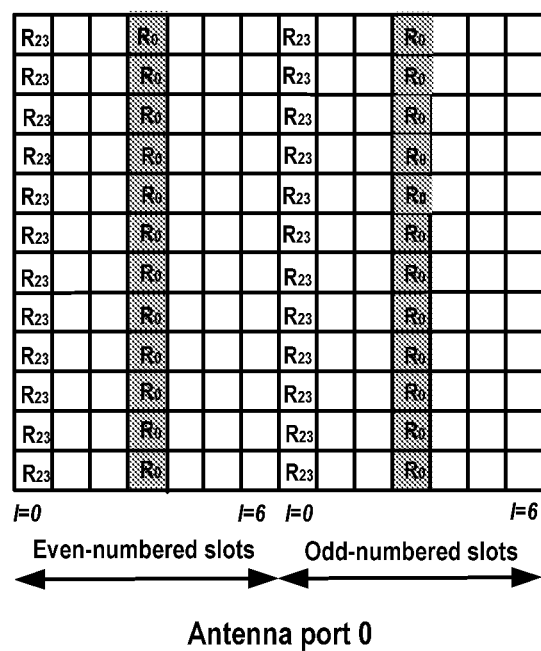
FIG. 9 schematically illustrates an exemplary uplink MTCRS pattern for MTC according to an embodiment of the present disclosure.

FIG. 8 also schematically illustrates another downlink MTCRS pattern for MTC according to an embodiment of the present disclosure. Different from those illustrated in FIGS. 5A and 5B, this MTCRS as illustrated in FIG. 9 is based on DMRS instead of CRS in Rel. 8. As illustrated, there are newly added reference signal ports 23 and 24 to for antenna port 7 and 9 respectively. As is clear, all reference symbols $R_{23}$ and $R_{24}$ have similar locations in frequency domain to the original reference symbols $R_7$ and $R_9$ respectively, i.e., they are shifting in a similar way to the reference symbols $R_7$ and $R_9$ respectively. Except the first three time slots for public channel and the time slots occupied by reference symbols $R_0$ and $R_1$, reference symbols $R_{23}$ and $R_{24}$ occupies a half of the remaining eight time slots even though they may also occupy more or even all of these time slots. From the description of mapping to resource elements regarding FIGS. 5A and 5B, the skilled in the art may learn the mapping for the MTCRS as illustrated in FIG. 8 and thus no description is elaborated herein. Additionally, for antenna ports 8 and 10, MTCRS can be arranged in a similar way.

FIG. 9 schematically illustrates an uplink MTCRS pattern for MTC according to an embodiment of the present disclosure. It is clear that the uplink MTCRS is based on DMRS in Rel. 10, wherein reference signal port 0 is a legacy port and reference signal port 23 is a new port as proposed in the present disclosure. As is shown, reference symbols $R_{23}$ have similar locations to the legacy reference symbols $R_0$ in frequency domain, and they occupy all subcarriers in two of the time slots not occupied by reference symbols $R_0$ although they may occupy more or less time slots or part of the subcarriers in a time slot.

Figure 10A:
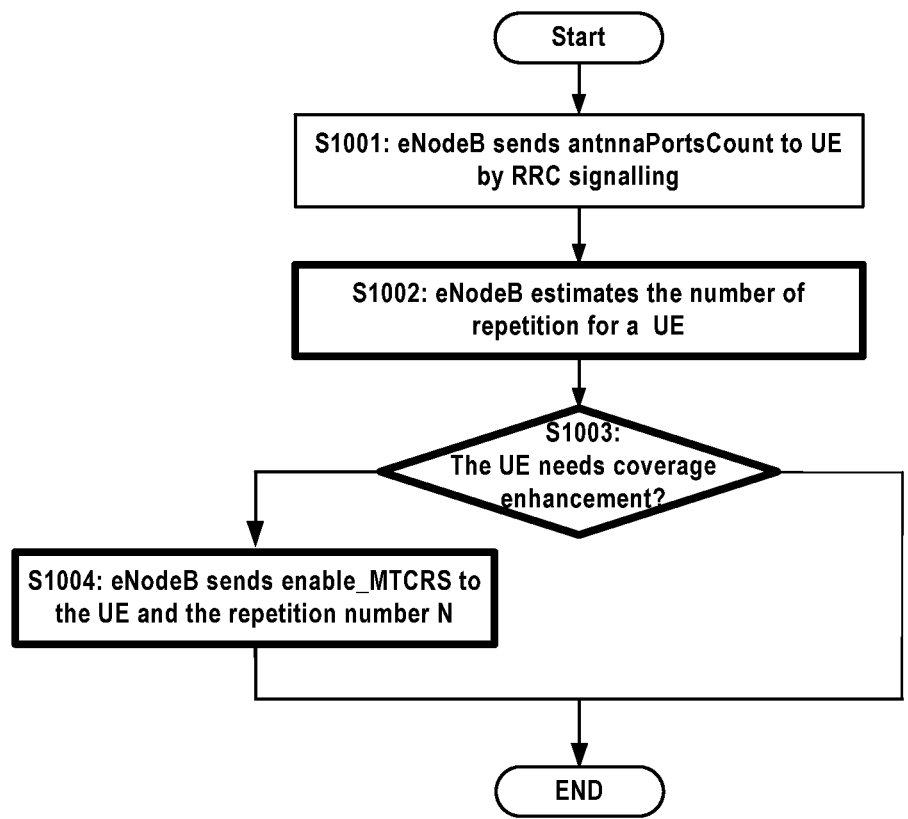
FIG. 10A schematically illustrates a flow chart of a method for configuring UE for coverage enhancement in uplink transmission according to an embodiment of the present disclosure.

FIG. 10A schematically illustrates a flow chart of a method for configuring UE for coverage enhancement in uplink transmission according to an embodiment of the present disclosure. As illustrated, at step S1001, the eNB sends a parameter antennaPortsCount to all UEs by for example, a RRC signaling. The parameter antennaPortsCount contains information for indicating antenna ports for transmitting reference signals, for example antenna port 0. Then at step S1002, the eNB may estimate the transmission repetition number for a UE. Specifically, the eNB first estimates SNR of the UE and then it may determine the repetition number N based on the estimated SNR and a predetermined relationship curve of the SNR and the repetition number. For example, by looking up the predetermined relationship curve with the estimated SNR, it may find a repetition number corresponding to the estimated SNR, which may be determined as the transmission repetition number for the UE.

After that, at step S1003, it may determine whether the UE needs coverage enhancement or not. For example, if the estimated SNR is lower than a predetermined threshold or the UE belongs to a type of UE with a low SNR, it may determine the UE needs coverage enhancement. If the UE needs coverage enhancement, then the procedure proceeds into step S1004, in which the eNB sends an enable MTCRS indication to the UE to indicate that the MTCRS will be used in addition to the traditional reference signal such as DMRS. Additionally, the eNB may transmit to the UE the estimated repetition number N so that the UE may obtain the repletion number for transmitting signals. On the other hand, if the UE does not require coverage enhancement, the procedure ends.

Figure 10B:
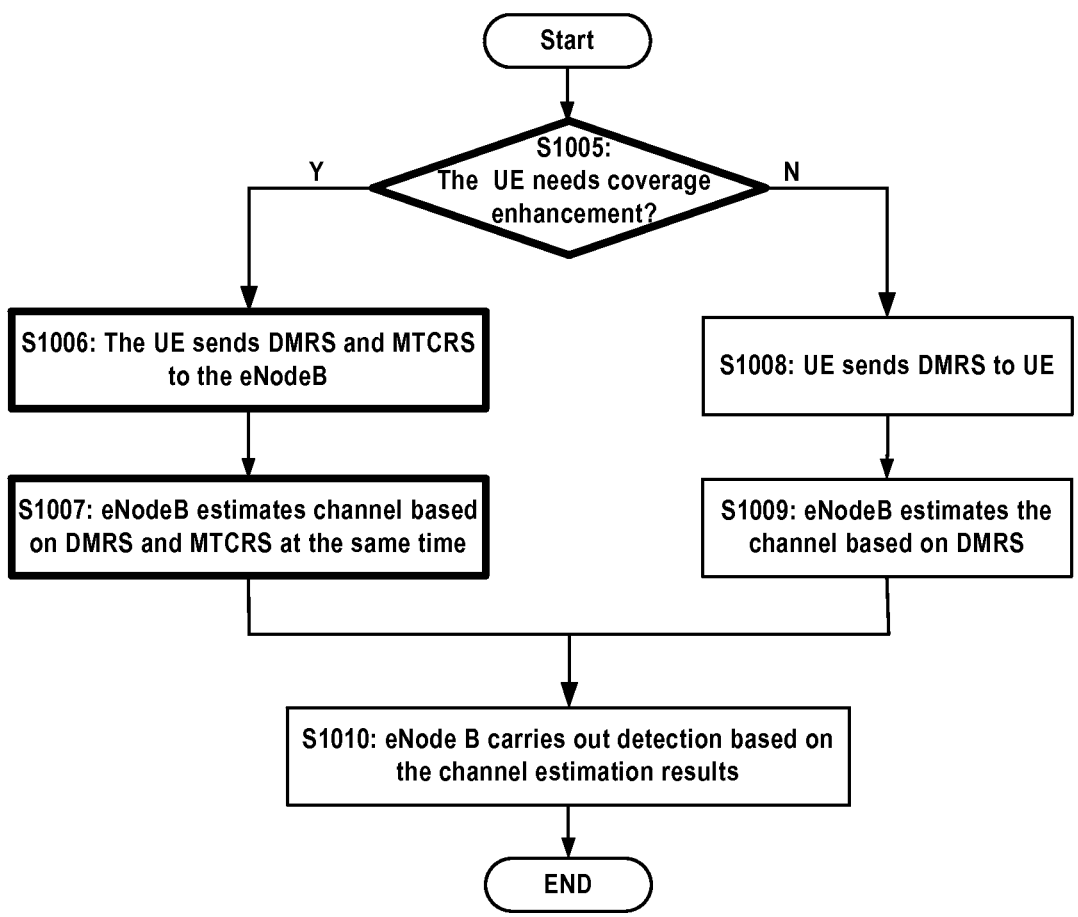
FIG. 10B schematically illustrates a flow chart of a method for channel estimation at an eNB for coverage enhancement in uplink transmission according to an embodiment of the present disclosure.

FIG. 10B schematically illustrates a flow chart of a method for channel estimation at UE for coverage enhancement in uplink transmission according to an embodiment of the present disclosure. As illustrated, the UE may first determine whether the UE needs coverage enhancement. If the UE does need coverage enhancement, then the procedure proceeds into step S1006, in which the UE sends both DMRS and MTCRS to the eNB. The MTCRS sequence may be generated in a similar way to the DMRS but using a different mapping. The MTCRS may be sent in a UE-specific way, they may be sent only when the physical uplink control channel is scheduled for the UE.

Next, the eNB may receive DMRS and MTCRS and estimate the uplink channel based on both DMRS and MTCRS at step S1007. On the other hand, if the UE does not require coverage enhancement, the procedure will proceed into step S1008, i.e., the UE sends only DRMS to the eNB as usual. Then, as step S1009, the eNB will estimate the uplink channel based on only the received DMRS. Finally, at Step S1010, the eNB will perform detection based on results of channel estimation.

Additionally, in the present disclosure, there is also provided apparatuses for downlink/uplink data transmission in a wireless communication system. Next, reference will be made to FIGS. 11 to 14 to describe the apparatuses as provided in the present disclosure.

Figure 11:
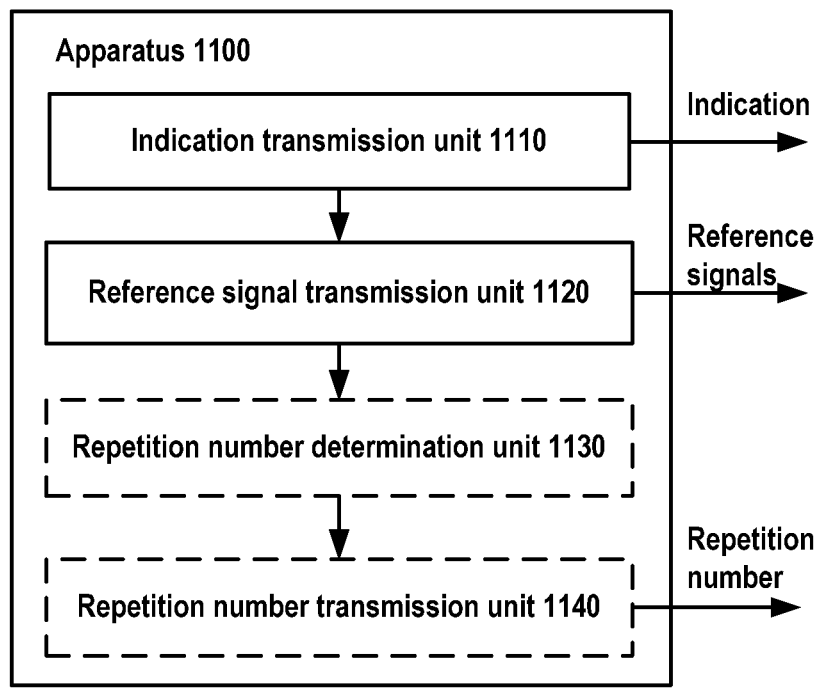
FIG. 11 schematically illustrates a block diagram of an apparatus for downlink data transmission at an eNB in a wireless communication system according to an embodiment of the present disclosure.

FIG. 11 schematically illustrates an apparatus 1100 for downlink data transmission at an eNB in a wireless communication system according to an embodiment of the present disclosure. It is clear from FIG. 11 that the apparatus 1100 may comprise an indication transmission unit 1110 and a reference signal transmission unit 1120. The indication transmission unit 1110 may be configured to transmit an indication for a new-type reference signal to a user equipment, wherein the new-type reference signal has an identical location in frequency domain to a legacy reference signal. The reference signal transmission unit 1120 may be configured to transmit the new-type reference signal and the legacy reference signal to the user equipment for using in channel estimation.

In an embodiment of the present disclosure, the new-type reference signal may be further designed so that it has a different location in time domain from the legacy reference signal.

Additionally, the apparatus 1100 may further comprise a repetition number determination unit 1130 and a repetition number transmission unit 1140. The repetition number determination unit 1130 may be configured to determine a transmission repetition number for the user equipment based on signal to noise ratio. The repetition number transmission unit 1140 may be configured to transmit the transmission repetition number to the user equipment.

In another embodiment of the present disclosure, the reference signal transmission unit 1120 may be further configured to transmit the new-type reference signal when a physical downlink shared channel resource is scheduled for the user equipment.

Figure 12:
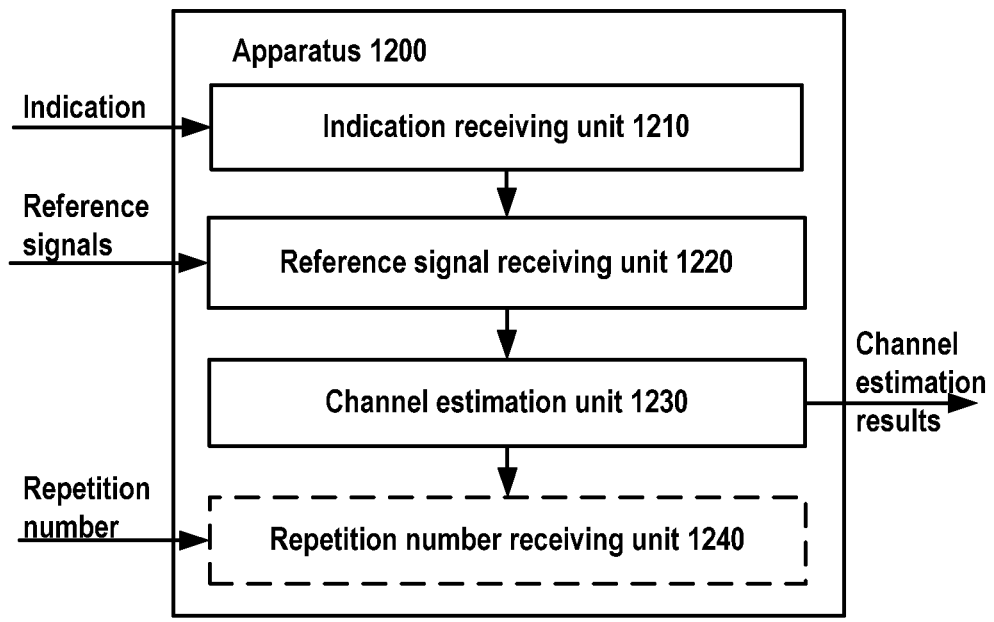
FIG. 12 schematically illustrates a block diagram of an apparatus for downlink data transmission at a UE in a wireless communication system according to an embodiment of the present disclosure.

FIG. 12 schematically illustrates an apparatus 1200 for downlink data transmission at a UE in a wireless communication system according to an embodiment of the present disclosure. As illustrated, the apparatus 1200 may comprise an indication receiving unit 1210, a reference signal receiving unit 1220 and a channel estimation unit 1230. The indication receiving unit 1210 may be configured to receive an indication for a new-type reference signal, wherein the new-type reference signal has an identical location in frequency domain to a legacy reference signal. The reference signal receiving unit 1220 may be configured to receive the new-type reference signal and the legacy reference signal in according to the indication. The channel estimation unit 1230 may be configured to perform channel estimation based on both the new-type reference signal and the legacy reference signal.

In an embodiment of the present disclosure, the new-type reference signal may be designed to have a different location in time domain from the legacy reference signal.

Additionally, as illustrated, the apparatus 1200 may further comprise a repetition number receiving unit 1240 configured to receive a transmission repetition number so as to perform signal demodulation based on the transmission repetition number.

Figure 13:
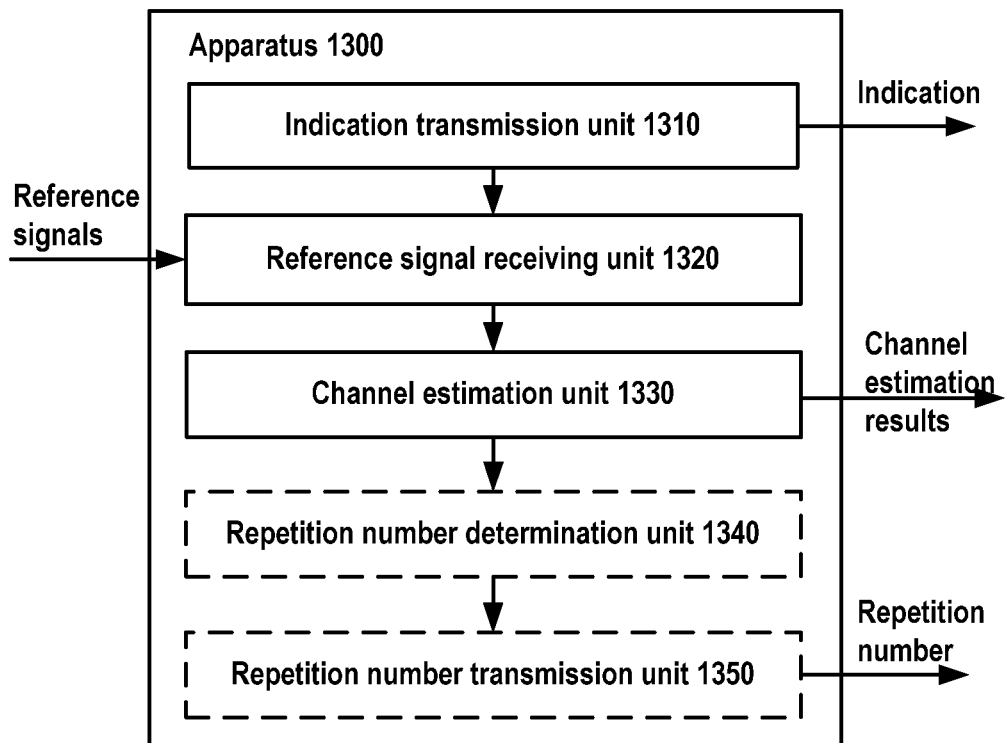
FIG. 13 schematically illustrates a block diagram of an apparatus for uplink data transmission at an eNB in a wireless communication system according to an embodiment of the present disclosure.

Besides, FIG. 13 schematically illustrates an apparatus 1300 for uplink data transmission at an eNB in a wireless communication system according to an embodiment of the present disclosure. As illustrated, the apparatus 1300 may comprise an indication transmission unit 1310, a reference signal receiving unit 1320 and a channel estimation unit 1330. The indication transmission unit 1310 may be configured to transmit an indication for a new-type reference signal to a user equipment, wherein the new-type reference signal has an identical location in frequency domain to a legacy reference signal. The reference signal receiving unit 1320 may be configured to receive the new-type reference signal and the legacy reference signal from the user equipment. The channel estimation unit 1330 may be configured to perform channel estimation based on both the new-type reference signal and the legacy reference signal.

In an embodiment of the present disclosure, the new-type reference signal has a different location in time domain from the legacy reference signal.

In addition, as illustrated in FIG. 13, the apparatus 1300 may further comprise a repetition number determination unit 1340 and a repetition number determination unit 1350. The repetition number determination unit 1340 may be configured to determine a transmission repetition number for the user equipment based on signal to noise ratio. The repetition number determination unit 1350 may be configured to transmit the transmission repetition number to the user equipment.

Figure 14:
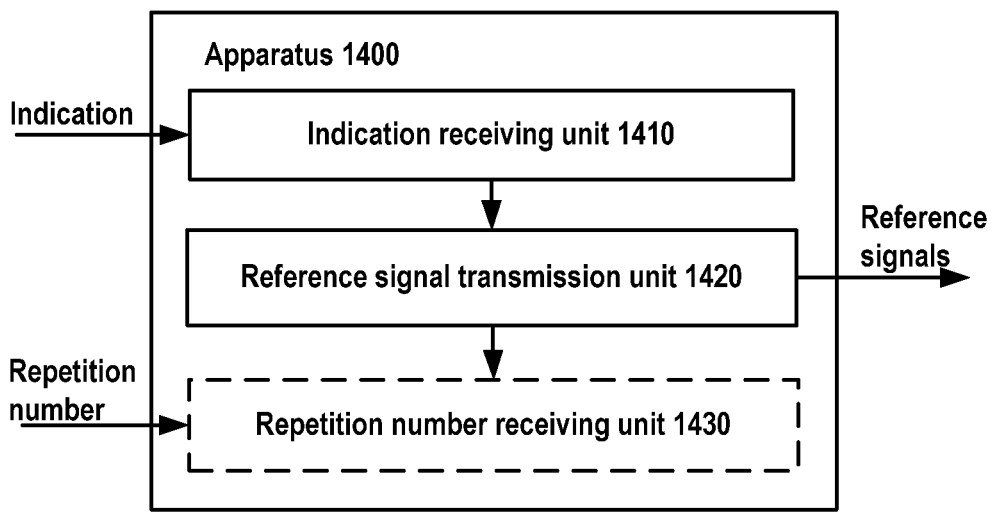
FIG. 14 schematically illustrates a block diagram of an apparatus for uplink data transmission at a UE in a wireless communication system according to an embodiment of the present disclosure.

FIG. 14 schematically illustrates an apparatus 1400 for uplink data transmission at a UE in a wireless communication system according to an embodiment of the present disclosure. The apparatus 1400 may comprise an indication receiving unit 1410 and a reference signal transmission unit 1420. The indication receiving unit 1410 may be configured to receive an indication for a new-type reference signal from a base station, wherein the new-type reference signal has an identical location in frequency domain to a legacy reference signal. The reference signal transmission unit 1420 may be configured to transmit the new-type reference signal and the legacy reference signal to the base station for using in channel estimation.

In an embodiment of the present invention, the new-type reference signal may have a different location in time domain from the legacy reference signal.

Additionally, the apparatus 1400 may further comprise a repetition number receiving unit 1430, which may be configured to receive a transmission repetition number from the base station so as to transmit signals based thereon.

In another embodiment of the present disclosure, the reference signal transmission unit 1420 is further configured to transmit the new-type reference signal when a physical uplink shared channel resource is scheduled for the user equipment.

It is noted that the apparatuses 1100 to 1400 may be configured to implement functionalities as described with reference to FIG. 3A to FIG. 4B. Therefore, for details about the operations of modules in these apparatus, one may refer to those descriptions made with respect to the respective steps of the methods with reference to FIGS. 3A to 10.

It is further noted that the components of the apparatuses 1100 to 1400 may be embodied in hardware, software, firmware, and/or any combination thereof. For example, the components of apparatuses 1100 to 1400 may be respectively implemented by a circuit, a processor or any other appropriate selection device. Those skilled in the art will appreciate that the aforesaid examples are only for illustration not limitation.

In some embodiment of the present disclosure, each of apparatuses 1100 to 1400 comprises at least one processor. The at least one processor suitable for use with embodiments of the present disclosure may include, by way of example, both general and special purpose processors already known or developed in the future. Each of apparatuses 1100 to 1400 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1100 to 1400 to at least perform operations according to the method as discussed with reference to FIGS. 3A, 3B 4A and 4B respectively.

In addition, FIGS. 15A and 15B and FIGS. 16A and 16B further illustrate simulation results made on an embodiment of the present invention and the existing solution in the prior art. Parameters used in the simulations are listed in Table 1.

TABLE 1

| Parameters used in the simulations | |
| --- | --- |
| Parameter | Assumptions used for simulation |
| System bandwidth | 14 MHz |
| Frame structure | FDD or TDD |
| UL-DL configurateion | 0 |
| Carrier Frequency | 2 GHz for FDD/2.6 GHz for TDD |
| Antenna configuration | 2 × 2, low correlation |
| Channel model | EPA, |
| Dopper spread | 1 Hz |
| MCS | 0 |
| Number of DL RBs | 6 |
| Transmission mode | TM2 |
| Frequency tracking factor | 100 Hz or 0 Hz |
| Performance target | 10% iBLER |
| Channel estimation | Realistic channel estimation |
| The minimum required SINR | −19.3 dB |
| Output | The amount of repetitions at the minimum required SINR |

Figure 15A:
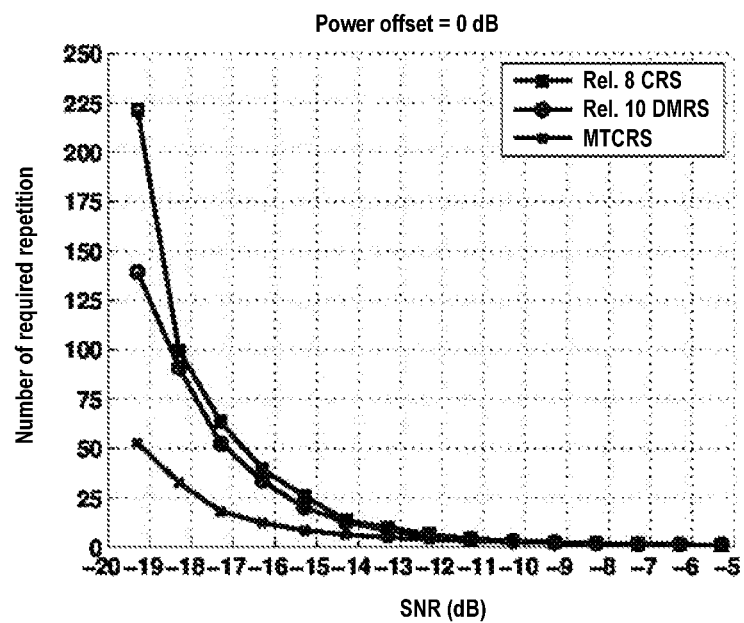
FIGS. 15A and 15B illustrate simulation results on performance of there different schemes with 0 dB power offset and 3 dB power offset.
Figure 15B:
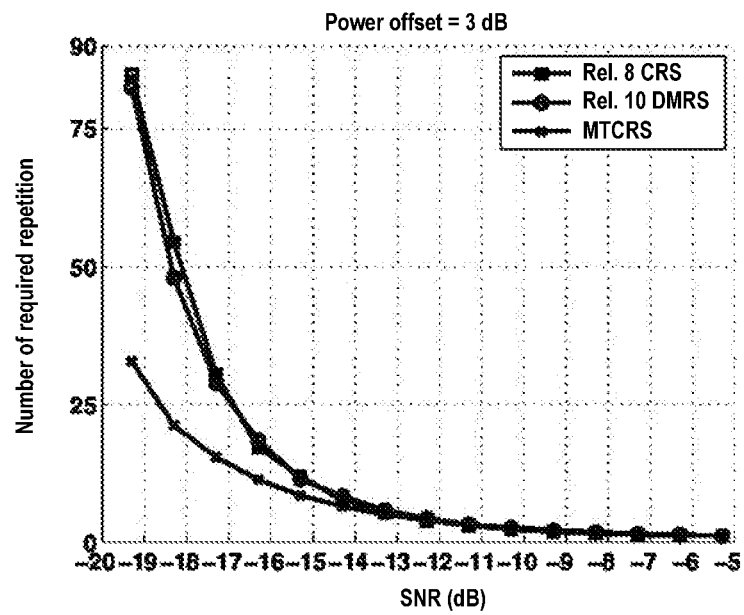

FIGS. 15A and 15B illustrate simulation results on performance of there different schemes with 0 dB power offset and 3 dB power offset. The three schemes include a Rel. 8 CRS based channel estimation, a Rel. 10 DMRS based channel estimation as proposed in R1-130237, and a MTCRS based channel estimation as proposed in the present document. From FIGS. 15A and 15B it is clear that the MTCRS based channel estimation as proposed in the present disclosure is always superior to the other two prior art schemes regardless of 0 dB power offset and 3 dB power offset. This lies in that in the MTCRS based channel estimation, channel estimation is performed based on both the newly introduced MTCRS and the legacy reference signal, which provides a higher accuracy of channel estimation.

Figure 16A:
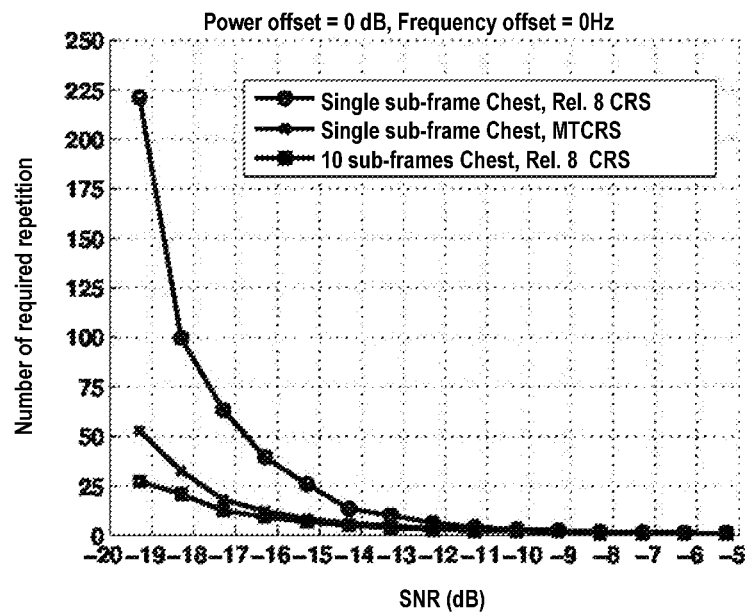
FIGS. 16A and 16B illustrate simulation results on performance of there different schemes with 0 Hz frequency offset and 100 Hz frequency offset.
Figure 16B:
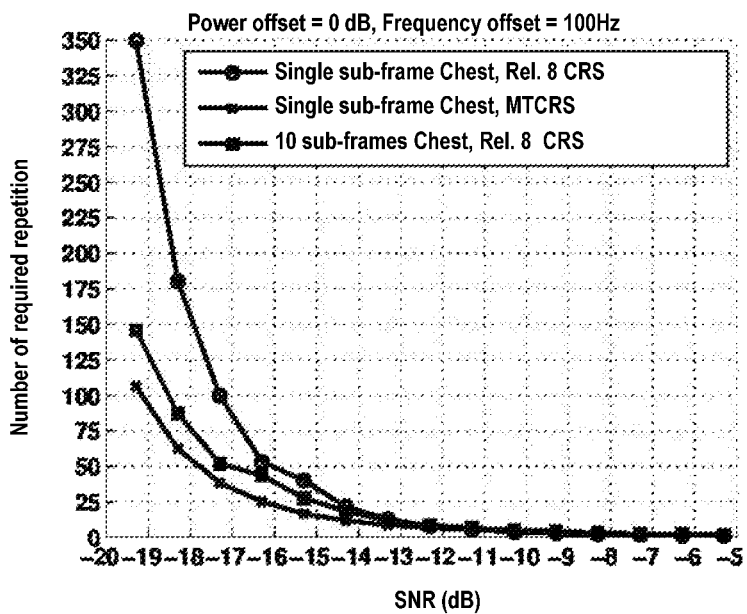

FIGS. 16A and 16B illustrate simulation results on performance of three different schemes with 0 Hz frequency offset and 100 Hz frequency offset, wherein the power offset is set as 0 dB. The three schemes are somewhat different from those in FIGS. 15A and 15B and they include a first channel estimation scheme based on a single sub-frame chest and Rel. 8 CRS, a second channel estimation scheme based on a signal sub-frame chest and MTCRS as proposed in the present invention, and a third estimation channel scheme based on ten sub-frames channel estimation and Rel. 8 CRS.

It is clear that the second channel estimation scheme as proposed in the present disclosure could achieve a better performance than the first channel estimation scheme both when there is a frequency offset and when there is no frequency offset. In a case that they both use a same single sub-frame Chest, the second channel estimation scheme as proposed in the present disclosure could always provide more accuracy and thus required repetition number is much lower.

Additionally, it may be also seen that when there is a frequency offset, the second channel estimation scheme as proposed in the present disclosure is also superior to the third channel estimation scheme which uses ten subframes channel estimation. However, in a case that there is no frequency offset, the third channel estimation achieves a somewhat better performance than the second one. This is because the third channel estimation scheme adopts ten sub-frames channel estimation, which can't track the phase error accumulation when the frequency offset is high. Therefore, it is clear that with the present invention, those UEs with a very low SNR (such as MTC UE) may be also used in LTE networks and may achieve a good performance.

The skilled in the art may appreciate that downlink/uplink MTCRS pattern and mapping given herein are only for a purpose of illustration and many other alternative pattern may be used with out departing the scope and spirit of the present disclosure.

Additionally, it may also be appreciated that the embodiments of the present disclosure are described with reference to MTC, however the present invention is not limited thereto and the present invention may be used any communication with a low SNR in LTE system.

Additionally, based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in the accompanying drawings may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method, performed by a base station in a wireless communication system, the method comprising:
   transmitting in a Physical Downlink Control Channel (PDCCH) for Machine Type Communication (MTC), to a user equipment (UE), first information, and
   transmitting second information to the UE,
   wherein:
      the first information indicates a transmission repetition number, an uplink transmission by the UE being performed according to the transmission repetition number, and
      the second information indicates whether or not to transmit second demodulation reference signal (DMRS);
   wherein:
      a first DMRS without the second DMRS is transmitted from the UE, if the second information indicates not to transmit the second DMRS, and
      the first DMRS and the second DMRS are transmitted from the UE if the second information indicates to transmit the second DMRS.

2. The method of claim 1, wherein the uplink transmission is performed in a physical uplink shared channel (PUSCH).

3. The method of claim 1, wherein the UE is configured in a coverage enhancement mode.

4. The method of claim 1, wherein the first information comprises a transmission repetition number corresponding to each one or more consecutive subframes.

5. The method according to claim 1, wherein a transmission scheme of the first information is transmit diversity.

6. The method of claim 1, further comprising:
   transmitting third information for configuring a first reference signal for the UE, the third information indicating an energy per resource element (EPRE) of a the first reference signal relative to an EPRE of a PDSCH, wherein the first reference signal is allocated with more EPRE than the PDSCH depending on the first information.

7. A method, performed by a User Equipment (UE) in a wireless communication system, the method comprising:
   receiving in a Physical Downlink Control Channel (PDCCH) for Machine Type Communication (MTC), from a base station (BS), first information;
   receiving second information from the BS, wherein the first information indicates a transmission repetition number, and the second information indicates whether or not to transmit second DMRS;
   performing an uplink transmission according to the transmission repetition number;
   transmitting a first DMRS without the second DMRS, if the second information indicates not to transmit the second DMRS, and
   transmitting a first DMRS and the second DMRS if the second information indicates to transmit the second DMRS.

8. The method of claim 7, wherein the uplink transmission is performed on a Physical Uplink Shared Channel (PUSCH).

9. The method of claim 7, wherein the UE is configured in a coverage enhancement mode.

10. The method of claim 7, wherein the first information comprises a transmission repetition number corresponding to each one or more consecutive subframes.

11. The method of claim 7, wherein a transmission scheme of the first information is transmit diversity.

12. The method of claim 7, further comprising:
    receiving third information for configuring a first reference signal for the UE, the third information indicating an energy per resource element (EPRE) of a the first reference signal relative to an EPRE of a PDSCH, wherein the first reference signal is allocated with more EPRE than the PDSCH depending on the first information.

* * * * *